US012353981B2

(12) United States Patent
Petrov et al.

(10) Patent No.: US 12,353,981 B2
(45) Date of Patent: Jul. 8, 2025

(54) TRAINING OF LARGE NEURAL NETWORKS

(71) Applicant: Google LLC, Mountain View, CA (US)

(72) Inventors: Slav Petrov, New York, NY (US); Yonghui Wu, Fremont, CA (US); Andrew M. Dai, San Francisco, CA (US); David Richard So, Brooklyn, NY (US); Dmitry Lepikhin, Menlo Park, CA (US); Erica Ann Moreira, Fremont, CA (US); Gaurav Mishra, Sunnyvale, CA (US); Jonathan Hudson Clark, Seattle, WA (US); Maxim Krikun, Castro Valley, CA (US); Melvin Jose Johnson Premkumar, Sunnyvale, CA (US); Nan Du, San Jose, CA (US); Orhan Firat, Mountain View, CA (US); Rohan Anil, San Francisco, CA (US); Siamak Shakeri, New York, NY (US); Xavier Garcia, New York, NY (US); Yanping Huang, Mountain View, CA (US); Yong Cheng, Mountain View, CA (US); Yuanzhong Xu, Mountain View, CA (US); Yujing Zhang, Sunnyvale, CA (US); Zachary Alexander Nado, Brookline, MA (US); Eric Jun Jie Ni, Mountain View, CA (US); Kefan Xiao, Sunnyvale, CA (US); Vladimir Feinberg, San Francisco, CA (US); Jin Young Sohn, Jersey City, NJ (US); Aurko Roy, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/661,499

(22) Filed: May 10, 2024

(65) Prior Publication Data

US 2024/0378427 A1 Nov. 14, 2024

Related U.S. Application Data

(60) Provisional application No. 63/465,487, filed on May 10, 2023.

(51) Int. Cl.
*G06F 40/284* (2020.01)
*G06N 3/04* (2023.01)
(Continued)

(52) U.S. Cl.
CPC ......... *G06N 3/0475* (2023.01); *G06F 40/284* (2020.01); *G06N 3/08* (2013.01)

(58) Field of Classification Search
CPC .... G06F 40/211; G06F 40/253; G06F 40/268; G06F 40/284; G06F 40/30; G06N 3/08
See application file for complete search history.

(56) References Cited

U.S. PATENT DOCUMENTS 10,885,436 B1 * 1/2021 Saleh .................... G06F 40/284
11,055,639 B1 * 7/2021 Cay ......................... G06F 9/547
(Continued)

OTHER PUBLICATIONS

Devlin et al., BERT: Pre-training of Deep Bidirectional Transformers for Language Understanding, 2019, Proceedings of the 2019 Conference of the North American Chapter of the Association for Computational Linguistics: Human Language Technologies, vol. 1 (Long and Short Papers), pp. 4171-41-86 (Year: 2019).*
(Continued)

*Primary Examiner* — Lamont M Spooner
(74) *Attorney, Agent, or Firm* — Fish & Richardson P.C.

(57) ABSTRACT

Methods, systems, and apparatus, including computer programs encoded on computer storage media, for training a neural network to perform any one or more of a variety of
(Continued)

Generate a plurality of prefix language modeling input sequences — 1002

Generate causal predictions of text tokens — 1004

Determine an update to the parameter values of the neural network — 1006 machine learning tasks. For example, the neural network can be configured as a generative neural network, e.g., an autoregressive generative neural network.

17 Claims, 12 Drawing Sheets

(51) Int. Cl.
*G06N 3/0475* (2023.01)
*G06N 3/08* (2023.01)

(56) References Cited

U.S. PATENT DOCUMENTS

| | | | | |
|---|---|---|---|---|
| 11,941,356 | B2 * | 3/2024 | Liu | G06N 3/084 |
| 2021/0174215 | A1 * | 6/2021 | Chan | G06F 16/282 |
| 2021/0232773 | A1 * | 7/2021 | Wang | G06F 18/21 |
| 2022/0092416 | A1 * | 3/2022 | Houlsby | G06N 3/08 |
| 2022/0164626 | A1 * | 5/2022 | Bird | G06N 3/084 |
| 2022/0382527 | A1 * | 12/2022 | Wang | G06N 3/084 |
| 2023/0034401 | A1 * | 2/2023 | Weston | G06F 40/30 |
| 2023/0090148 | A1 * | 3/2023 | Gamble, IV | G06N 10/40 |
| 2023/0124177 | A1 * | 4/2023 | Jayakumar | G06N 3/082 |
| | | | | 706/15 |
| 2023/0153546 | A1 * | 5/2023 | Peleg | G06F 40/211 |
| | | | | 704/9 |
| 2023/0195066 | A1 * | 6/2023 | Ramanasankaran | G05B 15/02 |
| | | | | 700/28 |
| 2023/0237773 | A1 * | 7/2023 | Li | G06F 40/126 |
| | | | | 382/155 |
| 2023/0244938 | A1 * | 8/2023 | Wei | G06N 3/045 |
| | | | | 706/25 |
| 2023/0281400 | A1 * | 9/2023 | Wang | G06F 40/284 |
| | | | | 704/2 |
| 2023/0316001 | A1 * | 10/2023 | Araki | G06F 40/35 |
| 2023/0325725 | A1 * | 10/2023 | Lester | G06N 3/0455 |
| 2023/0376676 | A1 * | 11/2023 | Mallinson | G06F 40/117 |
| 2023/0376841 | A1 * | 11/2023 | Le | G06N 3/092 |
| 2024/0061835 | A1 * | 2/2024 | Subramanian | G06F 16/252 |
| 2024/0095275 | A1 * | 3/2024 | Tambi | G06F 16/538 |

OTHER PUBLICATIONS

Tay et al., Unifying Language Learning Paradigms, 2022, arXiv:2205.05131 [cs.CL], pp. 1-32 (Year: 2022).*

Dong et al., Unified Language Model Pre-training for Natural Language Understanding and Generation, 2019, arXiv:1905.03197 [cs.CL], pp. 1-14 (Year: 2019).*

Liu et al., FCM: Forgetful Causal Masking Makes Causal Language Models Better Zero-Shot Learners, 2022, arXiv:2210.13432, pp. 1-16 (Year: 2022).*

Abid et al., "Persistent anti-muslim bias in large language models," arXiv:2101.05783, Jan. 2021, 17 pages.

Adiwardana et al., "Towards a human-like open-domain chatbot," arXiv:2001.09977, Jan. 2020, updated Feb. 2020, 38 pages.

Ai.google [online], "Our Principles," 2018, retrieved on Jun. 10, 2024, retrieved from URL <https://ai.google/responsibility/principles/>, 6 pages.

Ai.google.dev [online], "PaLM API and MakerSuite Additional Terms of Service," last modified Aug. 28, 2023, retrieved on Jun. 10, 2024, retrieved from URL <https://ai.google.dev/gemini-api/terms-archive/terms_08_28_23>, 2 pages.

Akhbardeh et al., "Findings of the 2021 conference on machine translation (WMT21)," Proceedings of the Sixth Conference on Machine Translation, Jan. 2021, 88 pages.

Alayrac et al., "Flamingo: a Visual Language Model for Few-Shot Learning," Advances in Neural Information Processing Systems, Oct. 2022, 35:23716-23736, 21 pages.

Austin et al., "Program synthesis with large language models," arXiv: 2108.07732, Aug. 2021, 34 pages.

Bai et al., "Training a helpful and harmless assistant with reinforcement learning from human feedback," arXiv: 2204.05862, Apr. 2022, 74 pages.

Bapna et al., "Building machine translation systems for the next thousand languages," arXiv: 2205.03983, May 2022, 77 pages.

Barham et al., "Pathways: Asynchronous distributed dataflow for ml," Proceedings of Machine Learning and Systems, Mar. 2022, 430-449.

Barocas et al., "Designing disaggregated evaluations of AI systems: Choices, considerations, and tradeoffs," Proceedings of the 2021 AAAI/ACM Conference on AI, Ethics, and Society, Jul. 2021, 368-378.

Barocas et al., "Limitations and opportunities," Fairness and Machine Learning, 2017, 294 pages.

Bender et al., "Data statements for natural language processing: Toward mitigating system bias and enabling better science," Transactions of the Association for Computational Linguistics, Dec. 2018, 6: 587-604.

Berant et al., "Semantic parsing on Freebase from question-answer pairs," Proceedings of the 2013 Conference on Empirical Methods in Natural Language Processing, Oct. 2013, 1533-1544.

Bhatt et al., "Re-contextualizing fairness in NLP: The case of India," arXiv:2209.12226, Sep. 2022, updated Nov. 2022, 14 pages.

Bisk et al., "PIQA: Reasoning about Physical Commonsense in Natural Language," Proceedings of the AAAI Conference on Artificial Intelligence, Apr. 2020, 7432-7439.

Blodgett et al., "Language (Technology) is Power: A Critical Survey of "Bias" in NLP,"arXiv: 2005.14050, May 2020, 23 pages.

Blodgett et al., "Stereotyping Norwegian salmon: An inventory of pitfalls in fairness benchmark datasets," Proceedings of the 59th Annual Meeting of the Association for Computational Linguistics and the 11th International Joint Conference on Natural Language Processing, Aug. 2021, 1004-1015.

Borkan et al., "Nuanced metrics for measuring unintended bias with real data for text classification," arXiv: 1903.04561, Mar. 2019, updated May 2019, 10 pages.

Bowman et al., "What Will it Take to Fix Benchmarking in Natural Language Understanding?," Proceedings of the 2021 Conference of the North American Chapter of the Association for Computational Linguistics: Human Language Technologies, Jun. 2021, 13 pages.

Brown et al., "Language models are few-shot learners," Advances in Neural Information Processing Systems, Jul. 2020, 1877-1901.

Carlini et al., "Extracting training data from large language models," USENIX Security Symposium, Aug. 11-13, 2021, 19 pages.

Carlini et al., "Quantifying Memorization Across Neural Language Models," arXiv:2202.07646, Feb. 2022, updated Mar. 2023, 19 pages.

Carlini et al., "The secret sharer: Evaluating and testing unintended memorization in neural networks," USENIX Security Symposium, Aug. 14-16, 2019, 19 pages.

Casad et al., "Stereotype Threat Among Girls: Differences by Gender Identity and Math Education Context," Psychology of Women Quarterly, Dec. 2017, 41(4):513-529, 18 pages.

Chen et al., "Evaluating large language models trained on code," arXiv: 2107.03374, Jul. 2021, 35 pages.

Chen et al., "Microsoft COCO Captions: Data Collection and Evaluation Server," arXiv:1504.00325, Apr. 2015, 1-7.

Chen et al., "PaLI: A Jointly-Scaled Multilingual Language-Image Model," arXiv:2209.06794, Sep. 2022, updated Jun. 2023, 33 pages.

Chen et al., "Question Directed Graph Attention Network for Numerical Reasoning over Text," Proceedings of the 2020 Conference on Empirical Methods in Natural Language Processing (EMNLP), Nov. 2020, 6759-6768.

Chowdhery et al., "PaLM: Scaling language modeling with Pathways," arXiv:2204.02311, Apr. 2022, updated Oct. 2022, 87 pages.

Chung et al., "Scaling instruction-finetuned language models," arXiv:2210.11416, Dec. 2022, 54 pages.

Clark et al., "Think you have Solved Question Answering? Try ARC, the AI2 Reasoning Challenge," arXiv: 1803.05457, Mar. 2018, 24 pages.

(56) References Cited

OTHER PUBLICATIONS

Clark et al., "TyDiQA: A benchmark for information-seeking question answering in typologically diverse languages," TACL, Jul. 2020, 17 pages.
Cobbe et al., "Training Verifiers to Solve Math Word Problems," arXiv:2110.14168, Oct. 2021, updated Nov. 2021, 22 pages.
Crenshaw, "Demarginalizing the intersection of race and sex: A black feminist critique of antidiscrimination doctrine, feminist theory and antiracist politics," Columbia Law School Scholarship Archive, 1989, 30 pages.
Dai et al., "Semi-supervised sequence learning," Advances in Neural Information Processing Systems, Nov. 2015, 10 pages.
Denton et al., "Bringing the People Back In: Contesting Benchmark Machine Learning Datasets," arXiv: 2007.07399, Jul. 2020, 6 pages.
Dev et al., "Harms of Gender Exclusivity and Challenges in Non-Binary Representation in Language Technologies," arXiv: 2108.12084, Aug. 2021, 26 pages.
Dev et al., "On Measures of Biases and Harms in NLP," arXiv: 2108.03362, Aug. 2021, 16 pages.
Dev et al., "On measures of biases and harms in NLP," arXiv: 2108.03362, Aug. 2021, updated Oct. 2022, 23 pages.
Devlin et al., "BERT: Pre-training of Deep Bidirectional Transformers for Language Understanding," Proceedings of the 2019 Conference of the North American Chapter of the Association for Computational Linguistics: Human Language Technologies, Jun. 2019, 4171-4186.
Diaz et al., "CrowdWorkSheets: Accounting for Individual and Collective Identities Underlying Crowdsourced Dataset Annotation," 2022 ACM Conference on Fairness, Accountability, and Transparency, retrieved from URL <https://arxiv.org/abs/2206.08931>, Jun. 2022, 1-11.
Dinan et al., "Build it Break it Fix it for Dialogue Safety: Robustness from Adversarial Human Attack," Proceedings of the 2019 Conference on Empirical Methods in Natural Language Processing and the 9th International Joint Conference on Natural Language Processing (EMNLP-IJCNLP), Nov. 2019, 4537-4546.
Dodge et al., "Documenting Large Webtext Corpora: A Case Study on the Colossal Clean Crawled Corpus," arXiv: 2104.08758, Aug. 2021, updated Sep. 2021, 20 pages.
Du et al., "GLaM: Efficient Scaling of Language Models with Mixture-of-Experts," arXiv: 2112.06905, Dec. 2021, updated Aug. 2022, 23 pages.
Dua et al., "DROP: A Reading Comprehension Benchmark Requiring Discrete Reasoning Over Paragraphs," Proceedings of the 2019 Conference of the North American Chapter of the Association for Computational Linguistics: Human Language Technologies, Jun. 2019, 2368-2378.
Feldman, "Does Learning Require Memorization? A Short Tale about a Long Tail," arXiv:1906.05271, Jun. 2019, updated Jan. 2021, 38 pages.
Freitag et al., "Experts, Errors, and Context: A Large-Scale Study of Human Evaluation for Machine Translation," Transactions of the Association for Computational Linguistics, Dec. 2021, 9:1460-1474.
Freitag et al., "Results of WMT22 Metrics Shared Task: Stop Using BLEU—Neural Metrics Are Better and More Robust," Proceedings of the Seventh Conference on Machine Translation (WMT), Dec. 2022, 46-68.
Ganguli et al., "Red Teaming Language Models to Reduce Harms: Methods, Scaling Behaviors, and Lessons Learned," arXiv:2209.07858, Aug. 2022, updated Nov. 2022, 30 pages.
Garg et al., "Handling Bias in Toxic Speech Detection: A Survey," arXiv:2202.00126, Jan. 2022, updated Jan. 2023, 30 pages.
Garg et al., "Word embeddings quantify 100 years of gender and ethnic stereotypes," Proceedings of the National Academy of Sciences, Apr. 2018, 115(16): E3635-E3644.
Gebru et al., "Datasheets for Datasets," Communications of the ACM, 2021, 64(12): 86-92.
Gehman et al., "RealToxicityPrompts: Evaluating Neural Toxic Degeneration in Language Models," Findings of the Association for Computational Linguistics: EMNLP 2020, Nov. 2020, 3356-3369.
Geva et al., "Did Aristotle Use a Laptop? A Question Answering Benchmark with Implicit Reasoning Strategies," Transactions of the Association for Computational Linguistics, Apr. 2021, 346-361.
github.com [online], "Pax," 2022, retrieved on Jun. 7, 2024, retrieved from URL <URL https://github.com/google/paxml>, 12 pages.
github.com [online], "Sax," 2022, retrieved on Jun. 10, 2024, retrieved from URL <https://github.com/google/saxml>, 7 pages.
Glaese et al., "Improving alignment of dialogue agents via targeted human judgements," arXiv: 2209.14375, Sep. 2022, 77 pages.
Goldfarb-Tarrant et al., "Intrinsic Bias Metrics Do Not Correlate with Application Bias," Proceedings of the 59th Annual Meeting of the Association for Computational Linguistics and the 11th International Joint Conference on Natural Language Processing, Aug. 2021, 1926-1940.
Goyal et al., "Is Your Toxicity My Toxicity? Exploring the Impact of Rater Identity on Toxicity Annotation," arXiv: 2205.00501, May 2022, 17 pages.
Goyal et al., "Making the v in VQA Matter: Elevating the Role of Image Understanding in Visual Question Answering," Proceedings of the IEEE Conference on Computer Vision and Pattern Recognition (CVPR), Jul. 2017, 6904-6913.
Graves, "Generating Sequences with Recurrent Neural Networks," arXiv:1308.0850, Aug. 2013, updated Jun. 2014, 1-43.
Hanna et al., "Towards a critical race methodology in algorithmic fairness," Proceedings of the 2020 Conference on Fairness, Accountability, and Transparency, Jan. 2020, 501-512.
Hasan et al., "XL-Sum: Large-Scale Multilingual Abstractive Summarization for 44 Languages," Findings of the Association for Computational Linguistics: ACL-IJCNLP, Aug. 2021, 4693-4703.
Hendricks et al., "Women Also Snowboard: Overcoming Bias in Captioning Models," Proceedings of the European Conference on Computer Vision (ECCV), 2018, 771-787, 17 pages.
Hendrycks et al., "Measuring Mathematical Problem Solving with the MATH Dataset," arXiv: 2103.03874, Mar. 2021, updated Nov. 2021, 22 pages.
Hochreiter et al., "Long Short-Term Memory," Neural Computation, Nov. 1997, 9(8): 1735-1780, 32 pages.
Hoffmann et al., "Training Compute-Optimal Large Language Models," arXiv: 2203.15556, Mar. 2022, 36 pages.
Howard et al., "Universal Language Model Fine-tuning for Text Classification," Proceedings of the 56th Annual Meeting of the Association for Computational Linguistics, Jul. 2018, 328-339.
Hsiao et al., "Try Bard and share your feedback," Mar. 21, 2023, retrieved on Jun. 6, 2024, retrieved from URL <https://blog.google/technology/ai/try-bard/>, 7 pages.
Hu et al., "LoRA: Low-Rank Adaptation of Large Language Models," arXiv:2106.09685, Jun. 2021, updated Oct. 2021, 1-26.
Ippolito et al., "Preventing Verbatim Memorization in Language Models Gives a False Sense of Privacy," arXiv: 2210.17546, Oct. 2022, updated Sep. 2023, 26 pages.
Jacobs et al., "Measurement and Fairness," Proceedings of the 2021 ACM Conference on Fairness, Accountability, and Transparency, Mar. 2021, 375-385.
Jagielski et al., "Measuring Forgetting of Memorized Training Examples," arXiv:2207.00099, Jun. 2022, updated May 2023, 1-22.
Ji et al., "Survey of Hallucination in Natural Language Generation," arXiv:2202.03629, Feb. 2022, last updated Feb. 2024, 60 pages.
Jigsaw, "Exploring the Role of Human Raters in Creating NLP Datasets," Nov. 19, 2019, retrieved on Jun. 10, 2024, retrieved from URL <https://medium.com/jigsaw/creating-labeled-datasets-and-exploring-the-role-of- human-raters-56367b6db298>, 8 pages.
Joshi et al., "TriviaQA: A Large Scale Distantly Supervised Challenge Dataset for Reading Comprehension," Proceedings of the 55th Annual Meeting of the Association for Computational Linguistics, Jul. 2017, 1601-1611.
Jouppi et al., "A domain-specific supercomputer for training deep neural networks," Communications of the ACM, Jun. 2020, 63(7): 67-78.

(56) References Cited

OTHER PUBLICATIONS kaggle.com [online], “Jigsaw Multilingual Toxic Comment Classification,” 2019, retrieved on Jun. 10, 2024, retrieved from URL <https://www.kaggle.com/c/jigsaw-multilingual-toxic-comment-classification>, 6 pages.
kaggle.com [online], “Toxic Comment Classification Challenge,” 2018, retrieved on Jun. 10, 2024, retrieved from URL <https://www.kaggle.com/c/jigsaw-toxic-comment-classification-challenge>, 3 pages.
Kaplan et al., “Scaling Laws for Neural Language Models,” arXiv: 2001.08361, Jan. 2020, 1-30.
Keyes, “The Misgendering Machines: Trans/HCI Implications of Automatic Gender Recognition,” Proceedings of the ACM on Human-Computer Interaction, Nov. 2018, 2(CSCW): 22 pages.
Kneser et al., “Improved backing-off for M-gram language modeling,” International Conference on Acoustics, Speech, and Signal Processing, May 1995, 181-184.
Korbak et al., “Pretraining Language Models with Human Preferences,” arXiv:2302.08582, Feb. 2023, updated Jun. 2023, 1-28.
Kreutzer et al., “Quality at a Glance: An Audit of Web-Crawled Multilingual Datasets,” Transactions of the Association for Computational Linguistics, Jan. 2022, 10: 50-72.
Kwiatkowski et al., “Natural Questions: A Benchmark for Question Answering Research,” Transactions of the Association for Computational Linguistics, Aug. 2019, 7: 453-466.
Ladhak et al., “WikiLingua: A New Benchmark Dataset for Cross-Lingual Abstractive Summarization,” Findings of the Association for Computational Linguistics: EMNLP, Nov. 2020, 4034-4048.
Lai et al., “RACE: Large-scale Reading Comprehension Dataset From Examinations, ” Proceedings of the 2017 Conference on Empirical Methods in Natural Language Processing, Sep. 2017, 785-794.
Lee et al., “Deduplicating Training Data Makes Language Models Better,” arXiv:2107.06499, Jul. 2021, updated Mac. 2022, 22 pages.
Lee, “Welcome, singular ”they“,” Oct. 31, 2019, retrieved on Jun. 6, 2024, retrieved from URL <https://apastyle.apa.org/blog/singular-they>, 8 pages.
Lester et al., “The Power of Scale for Parameter-Efficient Prompt Tuning,” Proceedings of the 2021 Conference on Empirical Methods in Natural Language Processing, Nov. 2021, 3045-3059.
Levesque et al., “The Winograd Schema Challenge,” Thirteenth international conference on the principles of knowledge representation and reasoning, Jun. 2012, 552-561.
Lewkowycz et al., “Solving Quantitative Reasoning Problems with Language Models,” arXiv: 2206.14858, Jun. 2022, updated Jul. 2022, 1-54.
Liang et al., “Holistic Evaluation of Language Models,” arXiv: 2211.09110, Nov. 2022, updated Oct. 2023, 1-162.
Longpre et al., “The Flan Collection: Designing Data and Methods for Effective Instruction Tuning,” arXiv:2301.13688, Jan. 2023, updated Feb. 2023, 1-22.
Luccioni et al., “What’s in the Box? A Preliminary Analysis of Undesirable Content in the Common Crawl Corpus,” arXiv:2105.02732, May 2021, 8 pages.
Marino et al., “OK-VQA: A Visual Question Answering Benchmark Requiring External Knowledge,” Proceedings of the IEEE/CVF Conference on Computer Vision and Pattern Recognition (CVPR), Jun. 2019, 3195-3204.
Meurer et al., “SymPy: symbolic computing in Python,” PeerJ Computer Science, Jan. 2017, 27 pages.
Mihaylov et al., “Can a Suit of Armor Conduct Electricity? A New Dataset for Open Book Question Answering,” Proceedings of the 2018 Conference on Empirical Methods in Natural Language Processing, Oct.-Nov. 2018, 2381-2391.
Mitchell et al., “Model Cards for Model Reporting, ” Proceedings of the Conference on Fairness, Accountability, and Transparency, Jan. 2019, 220-229.
Mostafazadeh et al., “A corpus and cloze evaluation for deeper understanding of commonsense stories,” Proceedings of the 2016 Conference of the North American Chapter of the Association for Computational Linguistics: Human Language Technologies, Jun. 2016, 839-849.
Movva et al., “Coarse race data conceals disparities in clinical risk score performance,” Proceedings of the 8th Machine Learning for Healthcare Conference, PMLR, 2023, 219: 443-472, 47 pages.
Mozes et al., “Towards Agile Text Classifiers for Everyone,” arXiv: 2302.06541, Feb. 2023, updated Oct. 2023, 15 pages.
Narayan et al., “Don’t Give Me the Details, Just the Summary! Topic-Aware Convolutional Neural Networks for Extreme Summarization,” Proceedings of the 2018 Conference on Empirical Methods in Natural Language Processing, Oct.-Nov. 2018, 1797-1807.
Nie et al., “Adversarial NLI: A New Benchmark for Natural Language Understanding,” Proceedings of the 58th Annual Meeting of the Association for Computational Linguistics, Jul. 2020, 4885-4901.
OpenAI, “GPT-4 Technical Report,” arXiv:2303.08774, Mar. 2023, updated Mar. 2024, 1-100.
openai.com [online], “ChatGPT plugins,” Mar. 23, 2023, retrieved on Jun. 7, 2024, retrieved from URL <https://openai.com/blog/chatgpt-plugins>, 13 pages.
openai.com [online], “Introducing ChatGPT,” Nov. 30, 2022, retrieved on Jun. 7, 2024, retrieved from URL <https://openai.com/blog/chatgpt>, 8 pages.
Orlanski et al., “Measuring the Impact of Programming Language Distribution,” Proceedings of the 40th International Conference on Machine Learning, PMLR, Feb. 2023, 202: 26619-26645, 27 pages.
Ouyang et al., “Training language models to follow instructions with human feedback,” Advances in Neural Information Processing Systems, Oct. 2022, 15 pages.
Paperno et al., “The LAMBADA dataset: Word prediction requiring a broad discourse context,” Proceedings of the 54th Annual Meeting of the Association for Computational Linguistics, Aug. 2016, 1525-1534.
Papineni et al., “Bleu: a method for automatic evaluation of machine translation,” Proceedings of the 40th Annual Meeting of the Association for Computational Linguistics, Jul. 2002, 311-318.
Parrish et al., “BBQ: A Hand-Built Bias Benchmark for Question Answering,” arXiv:2110.08193, Oct. 2021, updated Mar. 2022, 20 pages.
Paullada et al., “Data and its (dis)contents: A survey of dataset development and use in machine learning research,” Patterns, Nov. 2021, 2(11):100336, 1-14.
policies.google.com [online], “Generative AI Prohibited Use Policy,” last modified Mar. 14, 2023, retrieved on Jun. 10, 2024, retrieved from URL <https://policies.google.com/terms/generative-ai/use-policy>, 2 pages.
Ponti et al., “XCOPA: A Multilingual Dataset for Causal Commonsense Reasoning,” Proceedings of the 2020 Conference on Empirical Methods in Natural Language Processing (EMNLP), Nov. 2020, 2362-2376.
Pozzobon et al., “On the Challenges of Using Black-Box APIs for Toxicity Evaluation in Research,” arXiv:2304.12397, Apr. 2023, 1-19.
Prabhakaran et al., “Cultural Incongruencies in Artificial Intelligence,” arXiv:211.13069, Nov. 2022, 5 pages.
Prabhu et al., “Large image datasets: A pyrrhic win for computer vision?,” arXiv:2006.16923, Jun. 2020, updated Jul. 2020.
Pushkarna et al., “Data Cards: Purposeful and Transparent Dataset Documentation for Responsible AI,” Proceedings of the 2022 ACM Conference on Fairness, Accountability, and Transparency, Jun. 2022, 1776-1826.
Rae et al., “Scaling Language Models: Methods, Analysis & Insights from Training Gopher,” arXiv: 2112.11446, Dec. 2021, 1-118.
Rae et al., “Scaling Language Models: Methods, Analysis & Insights from Training Gopher,” arXiv: 2112.11446, Jan. 2022, 120 pages.
Raffel et al., “Exploring the Limits of Transfer Learning with a Unified Text-to-Text Transformer,” arXiv:1910.10683, Oct. 2019, updated Sep. 2023, 67 pages.
Raji et al., “AI and the Everything in the Whole Wide World Benchmark,” arXiv:2111.16366, Nov. 2021, 20 pages.

(56) References Cited

OTHER PUBLICATIONS

Rajpurkar et al., “Know What You Don’t Know: Unanswerable Questions for SQuAD,” Proceedings of the 56th Annual Meeting of the Association for Computational Linguistics, Jul. 2018, 2:784-789.
Ramesh et al., “How Platform-User Power Relations Shape Algorithmic Accountability: A Case Study of Instant Loan Platforms and Financially Stressed Users in India,” FAccT ’22: 2022 ACM Conference on Fairness, Accountability, and Transparency, Jun. 2022, 1917-1928.
Rauh et al., “Characteristics of Harmful Text: Towards Rigorous Benchmarking of Language Models,” NeurIPS 2022 Datasets and Benchmarks, 2022, 1-20.
Riley et al., “FRMT: A Benchmark for Few-Shot Region-Aware Machine Translation,” Transactions of the Association for Computational Linguistics, Jun. 2023, 11: 671-685.
Roberts et al., “How Much Knowledge Can You Pack Into the Parameters of a Language Model?,” Proceedings of the 2020 Conference on Empirical Methods in Natural Language Processing (EMNLP), Nov. 2020, 5418-5426.
Rodriguez et al., “Evaluation Examples are not Equally Informative: How should that change NLP Leaderboards?,” Proceedings of the 59th Annual Meeting of the Association for Computational Linguistics and the 11th International Joint Conference on Natural Language Processing, Aug. 2021, 4486-4503.
Ruder et al., “Square One Bias in NLP: Towards a Multi-Dimensional Exploration of the Research Manifold,” Findings of the Association for Computational Linguistics: ACL 2022, May 2022, 2340-2354.
Sakaguchi, “WinoGrande: an adversarial winograd schema challenge at scale,” Communications of the ACM, Aug. 2021, 64(9): 99-106.
Sambasivan et al., “Re-imagining Algorithmic Fairness in India and Beyond, ” FAccT ’21: Proceedings of the 2021 ACM Conference on Fairness, Accountability, and Transparency, Mar. 2021, 315-328.
Sap et al., “Annotators with Attitudes: How Annotator Beliefs and Identities Bias Toxic Language Detection,” arXiv: 2111.07997, Nov. 2021, updated May 2022, 23 pages.
Sap et al., “Social Bias Frames: Reasoning about Social and Power Implications of Language,” Proceedings of the 58th Annual Meeting of the Association for Computational Linguistics, Jul. 2020, 5477-5490.
Schick et al., “Self-Diagnosis and Self-Debiasing: A Proposal for Reducing Corpus- Based Bias in NLP,” arXiv: 2103.00453, Feb. 2021, updated Sep. 2021, 16 pages.
Schlangen, “Targeting the Benchmark: On Methodology in Current Natural Language Processing Research,” arXiv:2007.04792, Jul. 2020, 5 pages.
Selbst et al., “Fairness and Abstraction in Sociotechnical Systems,” Proceedings of the Conference on Fairness, Accountability, and Transparency, Jan. 2019, 59-68.
Sellam et al., “BLEURT: Learning Robust Metrics for Text Generation,” Proceedings of the 58th Annual Meeting of the Association for Computational Linguistics, Jul. 2020, pp. 7881-7892.
Shannon, “Prediction and Entropy of Printed English,” The Bell System Technical Journal, Jan. 1951, 30(1): 50-64.
Shelby et al., “Identifying Sociotechnical Harms of Algorithmic Systems: Scoping a Taxonomy for Harm Reduction,” arXiv: 2210.05791, Oct. 2022, updated Feb. 2023, 1-33.
Shi et al., “Language Models are Multilingual Chain-of-Thought Reasoners,” arXiv:2210.03057, Oct. 2022, 1-20.
Singh et al., “Towards VQA Models That Can Read,” Proceedings of the IEEE/CVF Conference on Computer Vision and Pattern Recognition (CVPR), Jun. 2019, 8317-8326.
Smith et al., ““I’m sorry to hear that”: Finding New Biases in Language Models with a Holistic Descriptor Dataset,” arXiv: 2205.09209, May 2022, updated Oct. 2022, 32 pages.
Srivastava et al., “Beyond the Imitation Game: Quantifying and extrapolating the capabilities of language models,” arXiv: 2206.04615, Jun. 2022, updated Jun. 2023, 1-95.
success.appen.com [online], “Guide to: Fair Pay,” 2023, retrieved on Jun. 10, 2024, retrieved from URL <https://success.appen.com/hc/en-US/articles/9557008940941-Guide-to-Fair-Pay>, 5 pages.
Suzgan et al., “Challenging BIG-Bench Tasks and Whether Chain-of-Thought Can Solve Them,” arXiv: 2210.09261, Oct. 2022, 1-49.
Tabachnyk et al., “ML-Enhanced Code Completion Improves Developer Productivity,” Jul. 26, 2022, retrieved on Jun. 7, 2024, retrieved from URL <https://research.google/blog/ml-enhanced-code-completion-improves-developer-productivity/>, 6 pages.
Talmor et al., “CommonsenseQA: A Question Answering Challenge Targeting Commonsense Knowledge,” Proceedings of the 2019 Conference of the North American Chapter of the Association for Computational Linguistics: Human Language Technologies, Jun. 2019, 4149-4158.
Tay et al., “UL2: Unifying Language Learning Paradigms,” The Eleventh International Conference on Learning Representations, 2023, 1-33.
The Replit Team, “Meet Replit Ghostwriter, your partner in code,” Oct. 31, 2022, retrieved on Jun. 7, 2024, retrieved from URL <https://blog.replit.com/ghostwriter>, 6 pages.
Thoppilan et al., “LaMDA: Language Models for Dialog Applications,” arXiv:2201.08239, Jan. 2022, updated Feb. 2022, 1-47.
Tomasev et al., “Fairness for Unobserved Characteristics: Insights from Technological Impacts on Queer Communities,” Proceedings of the 2021 AAAI/ACM Conference on AI, Ethics, and Society, Jul. 2021, 254-265.
Van Esch et al., “Writing System and Speaker Metadata for 2,800+ Language Varieties,” Proceedings of the Thirteenth Language Resources and Evaluation Conference, Jun. 2022, 5035-5046.
Vaswani et al., “Attention is all you need,” 31st Conference on Neural Information Processing Systems (NIPS 2017), Jun. 2017, 1-11.
Vilar et al., “Prompting PaLM for Translation: Assessing Strategies and Performance,” arXiv: 2211.09102, Nov. 2022, updated Jun. 2023, 20 pages.
Wang et al., “Self-Consistency Improves Chain of Thought Reasoning in Language Models,” arXiv:2203.11171, Mar. 2022, updated Mar. 2023, 1-24.
Wang et al., “SuperGlue: A stickier benchmark for general-purpose language understanding systems,” 33rd Conference on Neural Information Processing Systems (NeurIPS 2019), 2019, 1-15.
Wei et al., “Chain-of-Thought Prompting Elicits Reasoning in Large Language Models,” arXiv:2201.11903, Jan. 2022, updated Jan. 2023, 1-43.
Weidinger et al., “Ethical and social risks of harm from Language Models,” arXiv:2112.04359, Dec. 2021, 1-64.
Welty et al., “Metrology for AI: From Benchmarks to Instruments,” arXiv:1911.01875, Nov. 2019, 11 pages.
Xu et al., “Detoxifying Language Models Risks Marginalizing Minority Voices,” arXiv: 2104.06390, Apr. 2021, 8 pages.
Xu et al., “GSPMD: General and Scalable Parallelization for ML Computation Graphs,” arXiv: 2105.04663, May 2021, updated Dec. 2021, 1-16.
Xu et al., “Human Parity on CommonsenseQA: Augmenting Self-Attention with External Attention,” arXiv:2112.03254, Dec. 2021, updated May 2022, 8 pages.
Xue et al., “mT5: A Massively Multilingual Pre-trained Text-to-Text Transformer,” Proceedings of the 2021 Conference of the North American Chapter of the Association for Computational Linguistics: Human Language Technologies, Jun. 2021, 483-498.
Yin et al., “Natural Language to Code Generation in Interactive Data Science Notebooks,” arXiv:2212.09248, Dec. 2022, 46 pages.
Yu et al., “CoCa: Contrastive Captioners are Image-Text Foundation Models,” arXiv:2205.01917, May 2022, updated Jun. 2022, 1-19.
Zellers et al., “HellaSwag: Can a Machine Really Finish Your Sentence?,” Proceedings of the 57th Annual Meeting of the Association for Computational Linguistics, Jul. 2019, 4791-4800.
Invitation to Pay Additional Fees in International Appln. No. PCT/IB2024/000231, mailed on Oct. 2, 2024, 16 pages.
Liu et al., “Mitigating Unintended Memorization in Language Models via Alternating Teaching,” Presented at International Con-

(56) References Cited

OTHER PUBLICATIONS ference on Acoustics, Speech and Signal Processing, Rhodes Island, Greece, Jun. 4-10, 2023, 5 pages.

* cited by examiner

FIG. 1A can you fix this code with a bug and Add line by line comments in Korean.

```
int main() {
  int i;
  int array[5];
  for (i=0; i<=5; i++) {
    array[i] = i;
  }
  return 0;
}
```

Neural Network
110

Sure, here is the fixed code with line-by-line comments in Korean:

```
int main() {
  // 5개의 요소를 가진 정수형 배열을 선언합니다.
  int array[5];
  // for 루프를 사용하여 배열의 각 요소에 0부터 4까지의 숫자를 할당합니다
  for (int i = 0; i < 5; i++) {
    array[i] = i;
  }
  // 0을 반환합니다.
  return 0;
}
```

The bug in the original code was that the for loop was iterating from 0 to 5, but the array only had 5 elements. Therefore, the fix was to change the loop condition to i < 5.

TRAINING OF LARGE NEURAL NETWORKS

CROSS-REFERENCE TO RELATED APPLICATION

This application claims priority to U.S. Provisional Application No. 63/465,487, filed on May 10, 2023. The disclosure of the prior application is considered part of and is incorporated by reference in the disclosure of this application.

BACKGROUND

This specification relates to neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current value inputs of a respective set of parameters.

Training large-scale neural networks can be very difficult due to due to their immense model size and high computation cost. This is especially so because other issues, such as verbatim memorization of training data (which could potentially lead to undesired data leakage) and toxic content generation during inference, arise as model sizes increase.

SUMMARY

This specification describes a system implemented as computer programs on one or more computers in one or more locations that trains a neural network to perform any of a variety of downstream machine learning tasks on a network input.

In general, the training process has two stages: a pre-training stage, during which the neural network is pre-trained using a large amount of unlabeled training data, followed by an adaptation stage during which the pre-trained neural network is adapted, e.g., fine-tuned or few-shot learned, to one or more of the downstream tasks using training data that is specific to the downstream task(s). In particular, during the pre-training stage, the system uses a number of techniques to improve the effectiveness, efficiency, or both of the training process.

Particular embodiments of the subject matter described in this specification can be implemented so as to realize one or more of the following advantages.

Using some techniques described in this specification, e.g., techniques related to inserting "*canaries*" into the training data, a training system can test a neural network to determine the likelihood that the neural network has memorized training data and, optionally, to modify the training of the neural network to reduce the likelihood. In this way, techniques described in this specification can test whether a neural network may be subject to data leakage and, optionally, modify the training of the neural network to reduce the likelihood of data leakage.

Using some described techniques, e.g., techniques related to toxicity conditioning/control techniques, the training system can improve the overall quality of the outputs generated by the neural network after training, i.e., at inference time.

Through a combination of a large pre-training corpus purposefully curated from a diverse set of sources—including web documents, books, code, mathematics, and conversational data—and efficient training techniques that improve the multilingual and reasoning capabilities of the neural network while alleviating scaling-related issues, some techniques described in this specification can train a neural network to convergence significantly faster, e.g., in terms of wall clock time, as well as consuming reduced computing resources, than existing training systems.

From another point of view, this increase in training efficiency makes it possible a train a smaller neural network than some known neural networks using comparable amounts of computing resources. Once trained, the neural network will be able to achieve performance competitive with or even exceeding the state-of-the-art on a wide range of tasks despite having relatively smaller model sizes, thus being more suitable for deployment on mobile devices, embedded systems, or other hardware platforms with limited computational resources.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1A shows an example neural network.

Like reference numbers and designations in the various drawings indicate like elements.

DETAILED DESCRIPTION

Figure 1B:
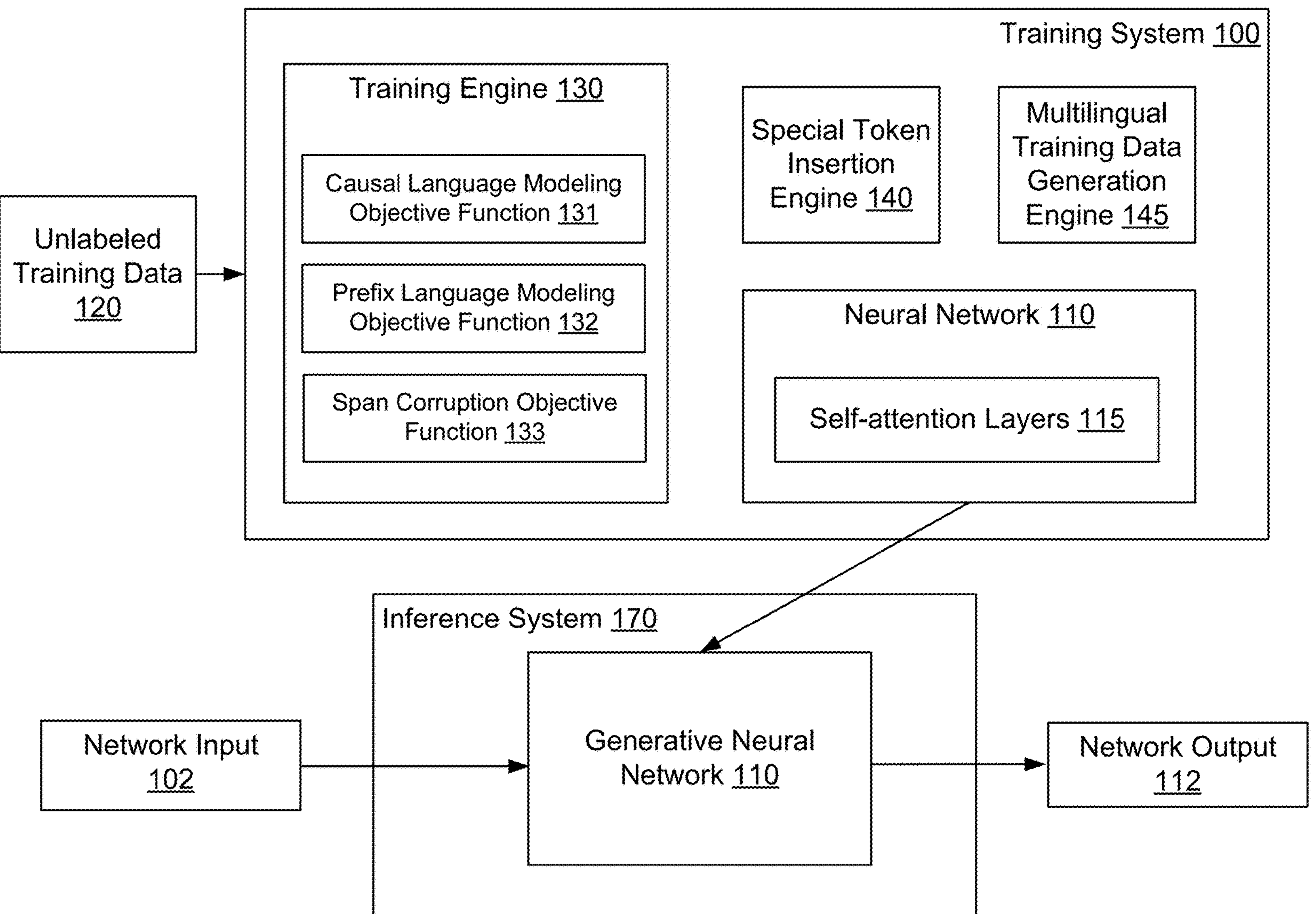
FIG. 1B shows an example training system and an example inference system.

FIG. 1A shows an example neural network 110. The neural network 110 can be configured through training to perform any kind of machine learning task in response to received requests, i.e., can be configured to receive any kind of digital data input and to generate any kind of score, classification, or regression output based on the input.

To improve the effectiveness, efficiency, or both of the training process, the training of the neural network 110 makes use of at least some of the techniques discussed in this specification, including verbatim memorization evaluation based on canary tokens, training the neural network 110 on a multilingual training dataset, and training the neural network 110 on a mixture of different pre-training tasks.

After training, the neural network 110 can be caused to perform any of a variety of machine learning tasks, some examples of which are described below. For example, the neural network 110 can be caused to perform a task by including a few-shot prompt for the task or a natural language instruction for the task in the input sequence to the neural network 110.

In some cases, the neural network 110 is a neural network that is configured to perform an image or video processing task, i.e., receive an input image or an input video having multiple frames (where each frame is an input image) and to process the intensity values of the pixels of the input image to generate a network output for the input image or the input video.

For example, the task may be image classification and the output generated by the neural network 110 for a given image may be scores for each of a set of object categories, with each score representing an estimated likelihood that the image contains an image of an object belonging to the category. As another example, the task can be image embedding generation and the output generated by the neural network 110 can be a numeric embedding of the input image. As yet another example, the task can be object detection and the output generated by the neural network 110 can identify locations in the input image at which particular types of objects are depicted. As yet another example, the task can be image semantic segmentation and the output generated by the neural network 110 can assign each pixel of the input image to a category from a set of categories. As yet another example, the task can be image instance segmentation and the output generated by the neural network 110 can assign each pixel of the input image to a respective object instance from a set of object instances. As yet another example, the task can be image depth prediction and the output generated by the neural network 110 can assign a respective predicted depth value to each pixel of the input image.

As another example, if the inputs to the neural network 110 are Internet resources (e.g., web pages), documents, or portions of documents or features extracted from Internet resources, documents, or portions of documents, the task can be to classify the resource or document, i.e., the output generated by the neural network 110 for a given Internet resource, document, or portion of a document may be a score for each of a set of topics, with each score representing an estimated likelihood that the Internet resource, document, or document portion is about the topic.

As another example, if the inputs to the neural network 110 are features of an impression context for a particular advertisement, the output generated by the neural network 110 may be a score that represents an estimated likelihood that the particular advertisement will be clicked on.

As another example, if the inputs to the neural network 110 are features of a personalized recommendation for a user, e.g., features characterizing the context for the recommendation, e.g., features characterizing previous actions taken by the user, the output generated by the neural network 110 may be a score for each of a set of content items, with each score representing an estimated likelihood that the user will respond favorably to being recommended the content item.

As another example, if the input to the neural network 110 is a sequence of text in one language, the output generated by the neural network 110 may be a piece of text in the other language that is a predicted proper translation of the input text into the other language.

Some implementations may be used for automatic code generation. For example the input may represent words, wordpieces or characters in a first natural language and the output may represent instructions in a computer programming or markup language, or instructions for controlling an application program to perform a task e.g. build a data item such as an image or web page.

As another example, the input to the neural network 110 may include computer code or a text description of the function of computer code and the output generated by the neural network is a sequence of computer code in a programming language that completes the input code in the context input or that performs the function described in the context input.

As a particular example of automatic code generation, FIG. 1A illustrates that the task may be automatic code debugging, where the input to the neural network includes buggy computer code in a programming language that potentially has defects or "bugs," and the output generated by the neural network includes fixed computer code in the programming language with the defects or "bugs" being corrected, or removed from the buggy computer code. Optionally, in the automatic code debugging task, the input to the neural network additionally includes a text description in any natural language, and the output generated by the neural network similarly includes a text description, e.g., code comments, in any natural language.

As another example, the task may be an audio processing task. For example, if the input to the neural network 110 is a sequence representing a spoken utterance, the output generated by the neural network 110 may be a text transcript for the utterance. As another example, the task may be a keyword spotting task where, if the input to the neural network 110 is a sequence representing a spoken utterance, the output generated by the neural network 110 can indicate whether a particular word or phrase ("hotword") was spoken in the utterance. As another example, if the input to the neural network 110 is a sequence representing a spoken utterance, the output generated by the neural network 110 can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram or other data defining audio of the text being spoken in the natural language.

As another example, the task can be a health prediction task, where the input is a sequence derived from electronic health record data for a patient and the output is a prediction that is relevant to the future health of the patient, e.g., a predicted treatment that should be prescribed to the patient, the likelihood that an adverse health event will occur to the patient, or a predicted diagnosis for the patient. Such electronic health data may, for example, comprise one or more sequences of physiological data taken from a patient, with the output being a corresponding prediction that relates to those sequences of data. Examples of physiological data and a corresponding prediction include: blood glucose measurements, with the prediction being a predicted future blood glucose measurement or the prediction of a hyper- or hypoglycemic event; a heart rate, with the prediction being the presence or absence of a heart condition, or a future cardiac event; blood pressure measurements, with the prediction being the risk of a future heart condition; or the like.

As another example, the task can be a text generation task, where the input is a sequence of text, and the output is another sequence of text, e.g., a completion of the input sequence of text, a response to a question posed in the input sequence, or a sequence of text that is about a topic specified by the first sequence of text. As another example, the input to the text generation task can be an input other than text, e.g., an image or a video, and the output can be text that describes the input.

The input sequence of text and the output sequence of text may be in the same language, or may alternatively be in different languages. For example, the task is a multilingual text generation task, where the input is a sequence of text in a first language, e.g., English, and the output generated by the neural network is a sequence of text in a second language, e.g., German. As another example, the input to the text generation task can be an input other than text, e.g., an image, and the output sequence can be text that describes the input.

In some implementations the input represents data to be compressed, e.g. image data, video data, text data, audio data, or any other type of data; and the output a compressed version of the data. The input and output may each comprise any representation of the data to be compressed/compressed data e.g. symbols or embeddings generated/decoded by a respective neural network.

As another example, the task can be an agent control task, where the input is a sequence of observations or other data characterizing states of an environment and the output defines an action to be performed by the agent in response to the most recent data in the sequence. The agent can be, e.g., a real-world or simulated robot, a control system for an industrial facility, or a control system that controls a different kind of agent. The observations may comprise sensor data captured by sensors associated with (e.g. part of) the agent, for example visual data, LIDAR data, sonar data, agent configuration data (e.g. joint angles), agent orientation data, or the like.

In some implementations, the environment is a real-world environment, the agent is a mechanical (or electro-mechanical) agent interacting with the real-world environment, e.g., a robot or an autonomous or semi-autonomous land, air, or sea vehicle operating in or navigating through the environment, and the actions are actions taken by the mechanical agent in the real-world environment to perform the task. For example, the agent may be a robot interacting with the environment to accomplish a specific task, e.g., to locate or manipulate an object of interest in the environment or to move an object of interest to a specified location in the environment or to navigate to a specified destination in the environment.

In these implementations, the observations may include, e.g., one or more of: images, object position data, and sensor data to capture observations as the agent interacts with the environment, for example sensor data from an image, distance, or position sensor or from an actuator. For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot. In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations. The observations may also include, for example, sensed electronic signals such as motor current or a temperature signal; and/or image or video data for example captured by a camera or a LIDAR sensor, e.g., data from sensors of the agent or data from sensors that are located separately from the agent in the environment.

In these implementations, the actions may be control signals to control the robot or other mechanical agent, e.g., torques for the joints of the robot or higher-level control commands, or the autonomous or semi-autonomous land, air, sea vehicle, e.g., torques to the control surface or other control elements e.g. steering control elements of the vehicle, or higher-level control commands. The control signals can include for example, position, velocity, or force/torque/acceleration data for one or more joints of a robot or parts of another mechanical agent. The control signals may also or instead include electronic control data such as motor control data, or more generally data for controlling one or more electronic devices within the environment the control of which has an effect on the observed state of the environment. For example in the case of an autonomous or semi-autonomous land or air or sea vehicle the control signals may define actions to control navigation e.g. steering, and movement e.g., braking and/or acceleration of the vehicle.

In some implementations the environment is a simulation of the above-described real-world environment, and the agent is implemented as one or more computers interacting with the simulated environment. For example, a system implementing the neural network 110 may be used to select actions in the simulated environment during training or evaluation of the system and, after training, or evaluation, or both, are complete, the action selection policy may be deployed for controlling a real-world agent in the particular real-world environment that was the subject of the simulation. This can avoid unnecessary wear and tear on and damage to the real-world environment or real-world agent and can allow the control neural network 110 to be trained and evaluated on situations that occur rarely or are difficult or unsafe to re-create in the real-world environment. For example the system may be partly trained using a simulation of a mechanical agent in a simulation of a particular real-world environment, and afterwards deployed to control the real mechanical agent in the particular real-world environment. Thus in such cases the observations of the simulated environment relate to the real-world environment, and the selected actions in the simulated environment relate to actions to be performed by the mechanical agent in the real-world environment.

In some implementations, as described above, the agent may not include a human being (e.g. it is a robot). Conversely, in some implementations the agent comprises a human user of a digital assistant such as a smart speaker, smart display, or other device. Then the information defining the task can be obtained from the digital assistant, and the digital assistant can be used to instruct the user based on the task.

For example, a system implementing the neural network 110 may output to the human user, via the digital assistant, instructions for actions for the user to perform at each of a plurality of time steps. The instructions may for example be generated in the form of natural language (transmitted as sound and/or text on a screen) based on actions chosen by the system. The system chooses the actions such that they contribute to performing a task. A monitoring system (e.g. a video camera system) may be provided for monitoring the action (if any) which the user actually performs at each time step, in case (e.g. due to human error) it is different from the action which the system instructed the user to perform. Using the monitoring system the system can determine whether the task has been completed. The system may identify actions which the user performs incorrectly with more than a certain probability. If so, when the system instructs the user to perform such an identified action, the system may warn the user to be careful. Alternatively or additionally, the system may learn not to instruct the user to perform the identified actions, i.e. ones which the user is likely to perform incorrectly.

More generally, the digital assistant instructing the user may comprise receiving, at the digital assistant, a request from the user for assistance and determining, in response to the request, a series of tasks for the user to perform, e.g. steps or sub-tasks of an overall task. Then for one or more tasks of the series of tasks, e.g. for each task, e.g. until a final task of the series the digital assistant can be used to output to the user an indication of the task, e.g. step or sub-task, to be performed. This may be done using natural language, e.g. on a display and/or using a speech synthesis subsystem of the digital assistant. Visual, e.g. video, and/or audio observations of the user performing the task may be captured, e.g. using the digital assistant. A system as described above may then be used to determine whether the user has successfully achieved the task e.g. step or sub-task, i.e. from the answer as previously described. If there are further tasks to be completed the digital assistant may then, in response, progress to the next task (if any) of the series of tasks, e.g. by outputting an indication of the next task to be performed. In this way the user may be led step-by-step through a series of tasks to perform an overall task. During the training of the neural network 110, training rewards may be generated e.g. from video data representing examples of the overall task (if corpuses of such data are available) or from a simulation of the overall task.

In a further aspect there is provided a digital assistant device including a system as described above. The digital assistant can also include a user interface to enable a user to request assistance and to output information. In implementations this is a natural language user interface and may comprise a keyboard, voice input-output subsystem, and/or a display. The digital assistant can further include an assistance subsystem configured to determine, in response to the request, a series of tasks for the user to perform. In implementations this may comprise a generative (large) language model, in particular for dialog, e.g. a conversation agent such as Sparrow (Glaese et al. arXiv:2209.14375) or Chinchilla (Hoffmann et al. arXiv:2203.15556). The digital assistant can have an observation capture subsystem to capture visual and/or audio observations of the user performing a task; and an interface for the above-described language model neural network 110 (which may be implemented locally or remotely). The digital assistant can also have an assistance control subsystem configured to assist the user. The assistance control subsystem can be configured to perform the steps described above, for one or more tasks e.g. of a series of tasks, e.g. until a final task of the series. More particularly the assistance control subsystem and output to the user an indication of the task to be performed, capture, using the observation capture subsystem, visual or audio observations of the user performing the task, determine from the above-described answer whether the user has successfully achieved the task. In response the digital assistant can progress to a next task of the series of tasks and/or control the digital assistant, e.g. to stop capturing observations.

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the machine learning task is a combination of multiple individual machine learning tasks, i.e., the system is configured to perform multiple different individual machine learning tasks, e.g., two or more of the machine learning tasks mentioned above. For example, the system can be configured to perform multiple individual natural language understanding tasks, with the network input including an identifier for the individual natural language understanding task to be performed on the network input.

In some cases, the machine learning task is a multi-modal processing task that requires processing multi-modal data. In general, multi-modal data is a combination of two or more different types of data, e.g., two or more of audio data, image data, text data, or graph data. As one example the multi-modal data may comprise audio-visual data, comprising a combination of pixels of an image or of video and audio data representing values of a digitized audio waveform. As another example the multi-modal data may comprise a combination of i) text data representing text in a natural language and ii) pixels of an image or of video or audio data representing values of an audio waveform. Optionally, but not necessarily, the different types of data may represent the same or overlapping objects using the different modalities (types), and when processing multi-modal data the data may be mapped into a common embedding space.

As a particular example, the task is a multi-modal processing task that requires processing both text and image inputs, so that the neural network 110 includes both a computer vision neural network and a text processing neural network. That is, the target output to be generated by the computer vision neural network for a given image depends on one or more outputs generated by the text processing neural network for one or more corresponding text inputs (and vice versa). Examples of such tasks include open-vocabulary image classification, open-vocabulary object detection, image captioning, text-based image search, image-based retrieval, and so on.

More generally, the multi-modal processing task may correspond to any of the tasks previously described for any of the types of data making up the multi-modal combination. For example, an accuracy of the previously described tasks may be increased when the task is applied to multi-modal data combining the data for which the task has been previously described and another type of data. For example detection or classification of an object or event may be improved when data of multiple different types (modalities) is processed.

The example machine learning tasks described above are not exhaustive, and the neural network 110 may also be used to perform other tasks.

FIG. 1B shows an example training system 100 and an example inference system 170. The training system 100 and the inference system 150 are examples of a system implemented as computer programs on one or more computers in one or more locations, in which the systems, components, and techniques described below can be implemented.

The training system 100 includes a neural network 110. The neural network 110 is a neural network that can be configured through training to perform any one or more of the tasks mentioned above and possibly other tasks by processing a network input in accordance with a set of parameters of the neural network 110 to generate a network output for the task. For example, the parameter of the neural network 110 include weights and, optionally, biases of the layers of the neural network.

The neural network 110 can have any of a variety of Transformer-based neural network architectures, e.g., encoder-only Transformer architectures, encoder-decoder Transformer architectures, decoder-only Transformer architectures, other attention-based architectures, and so on.

Examples of such architectures include those described in Colin Raffel, Noam Shazeer, Adam Roberts, Katherine Lee, Sharan Narang, Michael Matena, Yanqi Zhou, Wei Li, and Peter J Liu. Exploring the limits of transfer learning with a unified text-to-text transformer. arXiv preprint arXiv: 1910.10683, 2019; Daniel Adiwardana, Minh-Thang Luong, David R. So, Jamie Hall, Noah Fiedel, Romal Thoppilan, Zi Yang, Apoorv Kulshreshtha, Gaurav Nemade, Yifeng Lu, and Quoc V. Le. Towards a human-like open-domain chatbot. CoRR, abs/2001.09977, 2020; Tom B Brown, Benjamin Mann, Nick Ryder, Melanie Subbiah, Jared Kaplan, Prafulla Dhariwal, Arvind Neclakantan, Pranav Shyam, Girish Sastry, Amanda Askell, et al. Language models are few-shot learners. arXiv preprint arXiv:2005.14165, 2020; and Aakanksha Chowdhery, et al. PaLM: Scaling Language Modeling with Pathways, arXiv preprint arXiv:2204.02311.

In some implementations the neural network 110 can be configured as, or include, a generative (large) language model or a multi-modal model, e.g., a visual and language model, to perform these example machine learning tasks. Hence, the neural network 110 may also be referred to as a "generative neural network."

In some implementations the neural network 110 can be configured to auto-regressively generate, as a network output, an output sequence made up of tokens selected from a vocabulary of tokens based on a network input that is an input sequence made up of tokens selected from the vocabulary of tokens.

The vocabulary of tokens can include any of a variety of tokens that represent text symbols or other symbols. For example, the vocabulary of tokens can include one or more of characters, sub-words, words, punctuation marks, numbers, or other symbols that appear in a corpus of natural language text and/or computer code. Hence, the neural network 110 may further be referred to as an "autoregressive generative neural network."

Additionally, or alternatively, the vocabulary of tokens can include tokens that can represent data other than text. For example, the vocabulary of tokens can include image tokens that represent a discrete set of image embeddings of an image that can be generated by an image encoder neural network based on processing the image. As another example, the vocabulary of tokens can include audio tokens that represent code vectors in a codebook of a quantizer, e.g., a residual vector quantizer.

More specifically, to generate a particular token at a particular position within an output sequence, the neural network 110 can process a current input sequence to generate a score distribution, e.g., a probability distribution, that assigns a respective score, e.g., a respective probability, to each token in the vocabulary of tokens.

For example, the current input sequence when generating a token at any given position in the output sequence can include an input sequence and the tokens at any preceding positions that precede the given position in the output sequence. As a particular example, the current input sequence can include the input sequence followed by the tokens at any preceding positions that precede the given position in the output sequence.

The neural network 110 can then select, as the particular token, a token from the vocabulary using the score distribution. For example, the neural network 110 can greedily select the highest-scoring token or can sample, e.g., using nucleus sampling or another sampling technique, a token from the distribution.

The neural network 110 includes multiple layers that each have respective parameters. Each of the multiple layers is configured to receive a layer input and apply the respective parameters for the layer to the layer input to generate the layer output of the layer, and then provide the layer output to one or more other layers of the neural network that are configured to receive input from the layer according to the neural network architecture.

The multiple layers of the neural network 110 include multiple self-attention layers 115, where each self-attention layer 115 is configured to receive as layer input a respective current representation of each of the text tokens in a current output sequence and to process the respective current representations to generate as layer output a respective updated representation of each of the text tokens in the current output sequence.

A self-attention layer 115 refers to a layer that includes a self-attention mechanism. To generate the layer output, a self-attention layer 115 applies the self-attention mechanism over the layer input, where the self-attention mechanism uses keys, queries, and values that are computed based on the parameters of the attention layer from the respective current representations.

Each self-attention layer 115 can optionally apply other operations to the representations as part of updating the representations, e.g., by making use of a position-wise feed-forward neural network, by applying layer normalization, by making use of residual connections, and so on.

Thus, the parameters of the neural network 110 can include at least (i) the weights of each self-attention layer in the sequence of self-attention layers 115, e.g., the weights of one or more query transformation layers, the weights of one or more key transformation layers, and the weights of one or more value transformation layers within an attention layer, and (ii) the weights and, optionally, the biases of each feed-forward layer included in each position-wise feed-forward neural network.

The parameters of the neural network 110 can also include the weights of an embedding layer of the neural network 110 that is configured to generate the embeddings of the text tokens in the current output sequence.

The neural network 110 can have additional layers and components that do not have (trainable) parameters, e.g., normalization layers, pooling layers, residual connections, softmax layers, logistic layers, and so on.

The training system 100 trains the neural network 110 using a training process that has two stages: a pre-training stage and an adaptation stage. During the pre-training stage, the training system 100 trains the neural network 110 on unlabeled training data 120 to repeatedly update the values of the parameters the neural network 110, i.e., to generate pre-trained values of the parameters from initial values.

During the adaptation stage, the training system 100 adapts, e.g., through fine-tuning adaptation, the pre-trained neural network 110 to any one or more of the downstream tasks using labeled training data that is specific to the downstream task(s). The downstream tasks can include any combination of one or more of the machine learning tasks mentioned above and possibly other tasks. Examples of fine-tuning adaptation technique include supervised fine-tuning (SFT), reinforcement learning from human feedback (RLHF), instruction tuning, and the like, that use different training objectives, different data, or both.

The unlabeled training data 120 includes multiple training input sequences. Each training input sequence has a plurality of positions. Each position has a text token selected from a vocabulary of text tokens. As mentioned above, the vocabulary of text tokens can include one or more of characters, sub-words, words, punctuation marks, numbers, or other symbols that appear in a corpus of natural language text and/or computer code. Additionally, or alternatively, the vocabulary of tokens can include tokens that can represent data other than text. For example, the vocabulary of tokens can include image tokens that represent a discrete set of image embeddings of an image that can be generated by an image encoder neural network based on processing the image. As another example, the vocabulary of tokens can include audio tokens that represent code vectors in a codebook of a quantizer, e.g., a residual vector quantizer.

In particular, the multiple training input sequences include text tokens across a diverse mixture of languages. In some implementations, the multiple training input sequences include text tokens in hundreds of natural languages and programming languages. In some implementations, the multiple training input sequences include no more than a predetermined amount of text tokens in any given language, e.g., text tokens in any given language make up at most a predetermined percentage of all text tokens included in the unlabeled training data 120.

Being referred to as "unlabeled" signifies that, for each training input sequence, a corresponding target output for the training input sequences, i.e., a target output that should be generated by the neural network 110 by processing the training input sequence, is either unavailable to or not used by the training system 100 during the pre-training.

Generally, a training engine 130 of the training system 100 performs the pre-training over a plurality of update iterations. At each update iteration, the training engine 130 updates the parameters of the neural network 110 using a plurality of training input sequences (a "batch" or a "mini-batch" of training input sequences) sampled from the unlabeled training data 120.

In particular, during the pre-training stage, the training engine 130 trains the neural network 110 on a mixture of different pre-training tasks on the unlabeled training data 120. Each pre-training task uses a respective pre-training objective function. Each pre-training task focuses on training the neural network 110 to learn a different aspect of language modeling. By training the neural network 110 on the mixture of different pre-training tasks, the training system 100 can train the neural network 110 in a way that improves its generalization capabilities at the adaptation stage, i.e., relative to training the neural network 110 on a single pre-training task.

The mixture of different pre-training tasks can include two or more of:

(i) A causal language modeling pre-training task. The causal language modeling pre-training task is a task that requires predicting, for each text token in a causal language modeling input sequence that is generated from a training input sequence, a text token that should occupy a particular position of the text token in the causal language modeling input sequence conditioned on text tokens at preceding positions in the causal language modeling input sequence. The causal language modeling pre-training task uses a causal language modeling objective function 131.

(ii) A prefix language modeling pre-training task. The prefix language modeling pre-training task is a task that requires predicting, for each text token in a suffix input sequence included in a prefix language modeling input sequence that is generated from a training input sequence, a text token that should occupy a position of the text token in the suffix conditioned on (a) text tokens in a prefix input sequence that precedes the suffix input sequence in the prefix language modeling input sequence and (b) text tokens at any preceding positions in the suffix input sequence. The prefix language modeling pre-training task uses a prefix language modeling objective function 132.

(iii) A span corruption pre-training task. The span corruption pre-training task is a task that requires predicting, for a span masked input sequence that is generated from a training input sequence and that replaces one or more contiguous text tokens previously included in training input sequence with one or more mask tokens, one or more text tokens that should occupy respective positions of the one or more mask tokens in the span masked input sequence. The span corruption pre-training task uses a span corruption objective function 133.

In implementations, during the pre-training stage, the training engine 130 trains the neural network 110 on at least two of the pre-training tasks mentioned above, e.g., on both the causal language modeling pre-training task and the prefix language modeling pre-training task; on the causal language modeling pre-training task, the prefix language modeling pre-training task, and the span corruption pre-training task.

In implementations the different pre-training tasks can be mixed according to a predetermined ratio in the mixture of different pre-training tasks. In one example, the causal language modeling pre-training task, the prefix language modeling pre-training task, and the span corruption pre-training task can be mixed in a 60%/20%/20% ratio. That is, 60% of all training input sequences obtained from the unlabeled training data 120 are used by the training engine 130 to generate causal language modeling input sequences, and then used to train the neural network 110 to perform the causal language modeling pre-training task; 20% of all training input sequences obtained from the unlabeled training data 120 are used by the training engine 130 to generate prefix language modeling input sequences, and then used to train the neural network 110 to perform the prefix language modeling pre-training task; 20% of all training input sequences obtained from the unlabeled training data 120 are used by the training engine 130 to generate span masked input sequences, and then used to train the neural network 110 to perform the span corruption pre-training task. In other examples, the causal language modeling pre-training task, the prefix language modeling pre-training task, and the span corruption pre-training task can be mixed in a 50%/25%/25% ratio, a 70%/15%/15% ratio, an 80%/10%/10% ratio, 80%/20%/0% ratio, and so on.

In some implementations the predetermined ratio according to which the different pre-training tasks are mixed in the mixture of different pre-training tasks can be defined by respective weights assigned to the pre-training tasks. For example, a user of the training system 100 can provide a user input specifying a respective weight assigned to each of the multiple different pre-training tasks, e.g., 0.6 for the causal language modeling pre-training task, 0.2 for the prefix language modeling pre-training task, and 0.2 for the span corruption pre-training task—and then during the pre-training stage, the training engine 130 repeatedly selects, based on the specified weights, a pre-training task from the multiple different pre-training tasks to train the neural network 110 on.

A common problem faced by generative neural networks such as the neural network 110 in FIG. 1 is data leakage in their outputs. Data leakage occurs when a trained neural network reveals information that is private to an individual or an organization and that was included in the training data 120 for the neural network 110 as part of its outputs generated after deployment. Depending on downstream machine learning tasks, data leakage may lead to a range of negative consequences, especially when the revealed information is sensitive, confidential, or otherwise protectable.

To minimize the negative consequences of data leakage, optionally, in some implementations, at each of various points during the pre-training stage, the training system 100 can estimate the likelihood that the neural network 110 has memorized content verbatim from the unlabeled training data 120 and then, depending on the likelihood, determine whether to modify the training of the neural network 110 to reduce the likelihood that the neural network 110 memorizes content from the unlabeled training data 120. The memorization evaluation is broadly applicable to any of a variety of pre-training tasks on which the neural network 110 is being trained, i.e., can be performed regardless of what objective functions the training engine 130 uses to train the neural network 110.

Verbatim memorization refers to the situation in which neural networks reproduce specific portions of text that they processed during training, e.g., when the neural networks reproduce sequences of multiple consecutive text tokens, e.g., text tokens that make up sentences or even passages of text, from their training corpus, verbatim. Verbatim memorization increases the risk of neural networks exposing private data from their training corpus.

To that end, the training system 100 includes a special token insertion engine 140 which can be used to modify at least some of the training input sequences included in the unlabeled training data 120 before the training takes place, i.e., before those training input sequences are used to train the neural network 110. The special token insertion engine 140 is an optional component of the training system 100.

In particular, the special token insertion engine 140 can modify a given training input sequence by inserting canary tokens as one type of special tokens into the given training input sequence. For any given training input sequence, canary tokens are tokens that were originally not included in the unlabeled training data 120; rather, they are inserted into the given training input sequence before the given training input sequence is processed by the neural network 110 during training.

In order to strike a balance between making canary tokens appear as outliers while also retaining specific characteristics of the training data, the canary tokens can take an appropriate form and can be inserted in appropriate positions within the given training input sequence.

For example, the canary tokens can take the form of interleaved canary tokens. That is, the special token insertion engine 140 obtains two training input sequences that include a first training input sequence and a second training input sequence from the unlabeled training data 120, generates a modified first training input sequence by inserting text tokens taken from the second training input sequence into the first training input sequence, and, generates a modified second training input sequence by inserting text tokens taken from the first training input sequence into the second training input sequence.

In this example, the modified first training input sequence and the modified second training input sequence will then be used to train the neural network 110. Because the canary tokens were taken from training input sequences from the unlabeled training data 120, they preserve some linguistic properties of the unlabeled training data 120.

After having trained the neural network 110 on training input sequences that include the modified first training input sequence and the modified second training input sequence, the training engine 130 then estimates a degree to which the trained neural network memorizes data in the unlabeled training data 120.

Specifically, the training engine 130 provides a test input sequence that includes a subset of the tokens previously included in the first training input sequence as input to the neural network 110, and uses the neural network 110 to process the test input sequence to generate one or more predicted continuations of the test input sequence. Each predicted continuation specifies a plurality of output tokens. That is, the training engine 130 uses the neural network 110 to predict, given the subset of the tokens previously included in the first training input sequence, the next tokens that follow the subset of the tokens in the first training input sequence.

To estimate the degree to which the trained neural network memorizes data in the unlabeled training data, the training engine 130 evaluates the plurality of output tokens specified by each predicted continuation against the remaining subset of text tokens included in the modified first training input sequence (that includes text tokens taken from the second training input sequence). For example, the evaluation can involve counting the total number of output tokens in each predicted continuation that also appear in the text tokens taken from the second training input sequence, and the estimated degree can be in proportion to the total counted number.

Other forms of canary tokens can additionally or alternatively be used. For example, the canary tokens can take the form of shuffle canary tokens. That is, the special token insertion engine 140 obtains a training input sequence and then generates a modified training input sequence by shuffling all of the text tokens included in the training input sequence, i.e., by changing the positions of the existing text tokens, so as to remove information associated with its sequence-level ordering. In this example, the modified training input sequence, which includes shuffled text tokens, will then be used to train the neural network 110.

Another common problem faced by generative neural networks such as the neural network 110 in FIG. 1 is toxicity in their outputs. Toxicity refers to the inclusion of harmful, offensive, or otherwise inappropriate content in the outputs generated by a neural network. Toxicity in the outputs generated by a trained neural network may lead to a range of negative consequences after it has been deployed for downstream machine learning tasks, e.g., dialog tasks, generative question answering tasks, and other open-ended language modeling tasks.

To that end, the special token insertion engine 140 can modify a given training input sequence by inserting a toxicity token as another type of special tokens into the given training input sequence. The toxicity token identifies a level of toxicity of the content represented by the given training input sequence.

The special token insertion engine 140 can determine, from a plurality of levels of toxicity, a determined level of toxicity based on content represented by the given training input sequence, and then prepend or append a particular toxicity token corresponding to the determined level of toxicity to the given training input sequence.

The inclusion of the toxicity tokens can alleviate the toxicity problem because, after training, the neural network 110 can be conditioned on a toxicity token that represents a low level of toxicity, thereby causing the neural network 110 to generate outputs with low levels of toxicity. That is, by training the neural network 110 to accurately estimate the toxicity of its outputs, it becomes possible to control the generation after training to yield outputs that have specified levels of toxicity.

In some implementations, the plurality of levels of toxicity can include two or more levels of toxicity, e.g., level 0 and level 1. In some implementations, the plurality of levels of toxicity can include three or more levels of toxicity, e.g., level 0, level 1, and level 2, where greater numbers indicate higher toxicity levels. For example, a level 2 toxicity token will be prepended or appended to a training input sequence that includes a greater amount of harmful, offensive, or otherwise inappropriate content, while a level 1 toxicity token will be prepended or appended to a training input sequence that includes a less amount of such content.

In some implementations, the special token insertion engine 140 need only do this for a relatively small number of training input sequences included in the unlabeled training data 120. That is, for a relatively small portion of, e.g., for fewer than 0.5%, 1%, or 5% of all training input sequences included in, the unlabeled training data 120, the training system 100 uses the special token insertion engine 140 to add toxicity tokens that identify the levels of toxicity in the content represented by those training input sequences.

To automatically determine the level of toxicity for the given training input sequence, the special token insertion engine 140 includes or accesses a text-based classifier engine. The text-based classifier engine can be implemented in any appropriate way to enable it to process the given training input sequence to classify the given training input sequence into one of the plurality of levels of toxicity.

For example, the text-based classifier engine can implement a text classifier machine learning model, e.g., a neural network (e.g., a language model neural network), a logistic regression model, a support vector machine (SVM), or a decision tree or random forest model, that generates toxicity classification outputs. As another example, the text-based classifier engine can implement a deterministic text-based classification algorithm, e.g., a human programmed algorithm, that generates toxicity classification outputs.

A further common problem faced by training generative neural networks such as the neural network 110 in FIG. 1 is the lack of multilingual training data in the unlabeled training data 120. For example, the unlabeled training data 120 could predominantly contain training input sequences that are each made up on text tokens in a same, particular language, but the training input sequences that are each made up of text tokens in two or more different languages may nevertheless be scarce.

The lack of multilingual training data in the unlabeled training data 120 may negatively impact the performance of the trained neural network 110, especially on multilingual downstream tasks that involve processing text tokens in two or more languages, e.g., translation tasks, multilingual text generation tasks, including multilingual question answering tasks.

To address the lack of multilingual training data and the challenges it presents in the training of the neural network 100, the training system 100 includes a multilingual training data generation engine 145 which can be used to generate additional multilingual training data based on what is already existing in the unlabeled training data 120. The multilingual training data generation engine 145 is an optional component of the training system 100.

When included, the multilingual training data generation engine 145 can be used by the training system 100 to generate multilingual training data from the training input sequences included in the unlabeled training data 120—and the training engine 130 then trains the neural network 100 on the multilingual training data.

The multilingual training data includes a plurality of first multilingual training pairs and a plurality of second multilingual training pairs. Each first multilingual training pair, in turn, includes a first source training input sequence and a first target training input sequence. Each second multilingual training pair, in turn, includes a second source training input sequence and a second target training input sequence. In particular, the first source training input sequences and the second source training input sequences are both in a same language while the first target training input sequences and the second target training input sequences are in different languages. Generating multilingual training data will be discussed further below with reference to FIG. 7.

The inclusion of multilingual training data further improves the capability of the neural network 110 to understand and generate multilingual outputs; it also enhances the performance of the trained neural network 110 on the multilingual downstream tasks that involve processing text tokens in two or more languages, e.g., translation tasks, multilingual text generation tasks, including multilingual question answering tasks.

After the pre-training stage, at the adaptation stage, the training system 100 or a different training system can fine-tune some or all of the parameters of the neural network 110 in order to adapt the neural network 110 to any of a variety of downstream tasks. For example, the training system 100 can fine-tune one or more of the components of the neural network 110 on labeled training data for a downstream task that is specific to the downstream task, e.g., through supervised learning, reinforcement learning from human feedback, or instruction tuning. As another example, the training system 100 can hold any parts of the neural network 110 that have been trained during the pre-training stage fixed while learning one or more additional, customized components that are specific to the downstream task.

After the adaptation stage, the training system 100 or a different inference system 170 deploys the trained neural network 110 on one or more computing devices to perform inference, i.e., to generate new network outputs 112 for the downstream task(s) for new network inputs 102.

Figure 2:
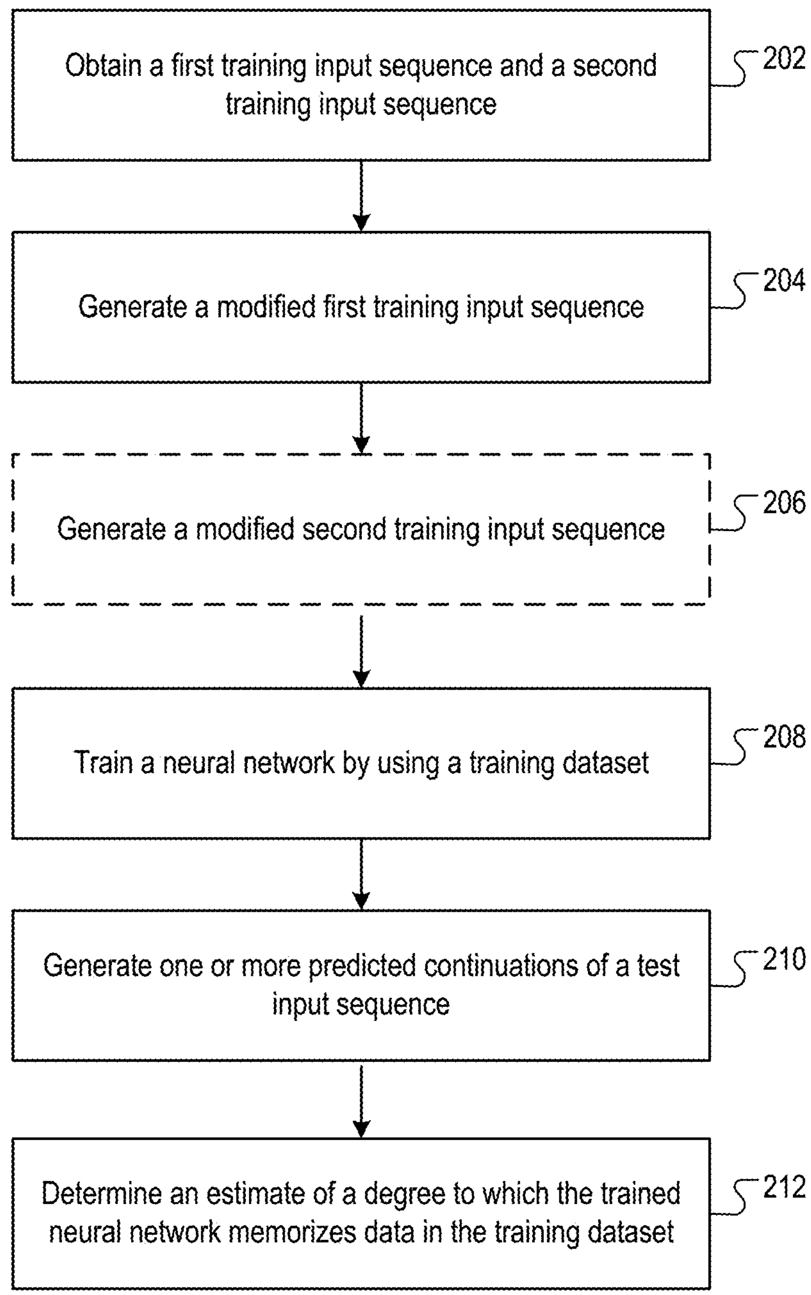
FIG. 2 is a flow diagram of an example process for training a neural network.

FIG. 2 is a flow diagram of an example process 200 for training a neural network that has parameters on a set of training data to repeatedly update values of the parameters the neural network. For convenience, the process 200 will be described as being performed by a system of one or more computers located in one or more locations. For example, a training system, e.g., the training system 100 of FIG. 1B, appropriately programmed, can perform the process 200.

The set of training data includes multiple training input sequences. The set of training data can include unlabeled training input sequences. Each training input sequence has a plurality of positions. Each position has a token selected from a vocabulary of tokens. As mentioned above, the vocabulary of tokens can include one or more of characters, sub-words, words, punctuation marks, numbers, or other symbols that appear in a corpus of natural language text and/or computer code. Additionally, or alternatively, the vocabulary of tokens can include tokens that can represent data other than text. For example, the vocabulary of tokens can include image tokens that represent a discrete set of image embeddings of an image that can be generated by an image encoder neural network based on processing the image. As another example, the vocabulary of tokens can include audio tokens that represent code vectors in a codebook of a quantizer, e.g., a residual vector quantizer.

For example, the training input sequences included in the training data can be generated from a large dataset of text in one or more natural languages, e.g., text that is publicly available from the Internet or another text corpus, a large dataset of computer code in one or more programming languages, e.g., Python, C++, C#, Java, Ruby, PHP, and so on, e.g., computer code that is publicly available from the Internet or another code repository, a large dataset of audio samples, e.g., audio recordings or waveforms that represent the audio recordings, a large dataset of images where each image includes an array of pixels, a large dataset of videos where each video includes a temporal sequence of frames, or a large multi-modal dataset that includes a combination of two or more of these datasets.

The process 200 may be repeated as often as necessary throughout the training of the neural network to obtain the most recent estimate of a degree to which the neural network memorizes data in the training data on which it is being trained. For example, the process 200 may be repeated every predetermined number of times the parameters of the neural network have been updated, every predetermined amount of wall clock time has elapsed since the beginning of the training, and so on. As another example, the process 200 can be triggered upon receiving an instruction from a user of the system.

The system obtains, e.g., through sampling, a first training input sequence and a second training input sequence from the training data (step 202). The first training input sequence includes first tokens selected from the vocabulary of tokens. The second training input sequence includes second tokens selected from the vocabulary of tokens.

In some implementations, the training data can be monolingual, and the first training input sequence and the second training input sequence are both in the same language, e.g., the same natural language or the same programming language. In other implementations, the training data can be multilingual, and the first training input sequence and the second training input sequence are in different languages. That is, the first training input sequence can be in a first language and the second training input sequence can be in a second language that is different from the first language.

Figure 3:
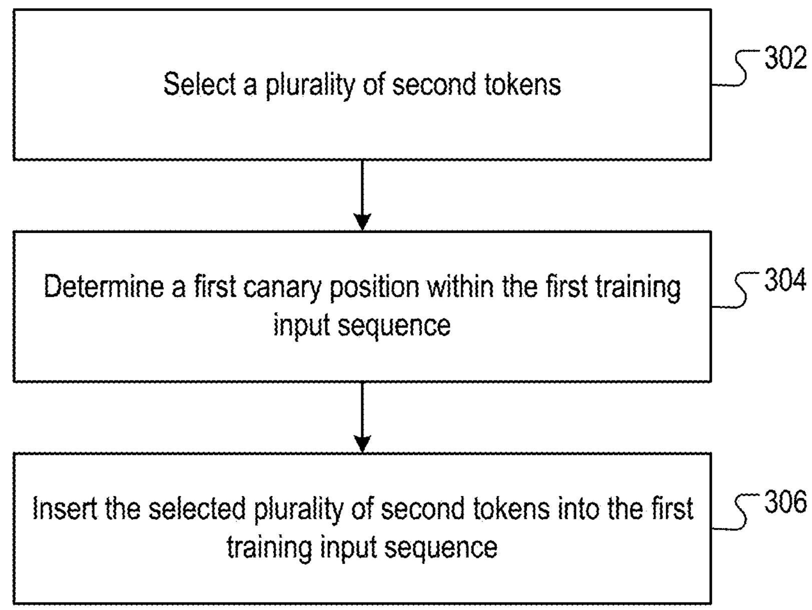
FIG. 3 is a flow diagram of sub-steps of one of the steps of the process of FIG. 2.

The system generates a modified first training input sequence based on the first training input sequence and the second training input sequence (step 204). Generating the modified first training input sequence is described below with reference to FIG. 3, which is a flow diagram of sub-steps 302-306 of step 204 of the process 200 of FIG. 2.

The system selects a plurality of second tokens from the second tokens included in the second training input sequence (step 302). The number of second tokens to be selected can be predetermined. The plurality of second tokens can be a sequence of text tokens that are adjacent to each other within the second training input sequence, i.e., that occupy multiple contiguous positions in the second training input sequence.

The system determines a first canary position within the first training input sequence (step 304). In some implementations, the first canary position can be determined independently of the positions of the selected plurality of second tokens within the second training input sequence. For example, the first canary position can be determined with uniform randomness, i.e., can be any position within the first training input sequence.

In some other implementations, the first canary position can be determined based on positions of the selected plurality of second tokens within the second training input sequence. For example, the first canary position within the first training input sequence can generally correspond to the positions of the selected plurality of second tokens within the second training input sequence.

That is, if the plurality of second tokens were taken from a first half of the second training input sequence, e.g., taken from within a threshold number of proportion of tokens of the beginning of the second training input sequence, then the first canary position can similarly be in the first half of the first training input sequence, e.g., within the threshold number of proportion of tokens of the beginning of the first training input sequence.

Analogously, if the plurality of second tokens were taken from a second half of the second training input sequence, e.g., taken from within a threshold number of proportion of tokens of the end of the second training input sequence, then the first canary position can similarly be in the second half of the first training input sequence, e.g., within the threshold number of proportion of tokens of the end of the first training input sequence.

The system generates the modified first training input sequence by inserting the selected plurality of second tokens into the first training input sequence after the first canary position, i.e., by placing the selected plurality of second tokens at multiple (e.g. multiple contiguous) positions beginning from the first canary position in the first training input sequence (step 306). Thus, the modified first training input sequence includes the first tokens that were initially included in the first training input sequence, as well as a plurality of second tokens that were taken from the second training input sequence. The plurality of second tokens that were taken from the second training input sequence thus act as canary tokens, i.e. they are additional tokens that were not originally included in the first training input sequence. The first canary position may be the first position in which one of these canary tokens is inserted into the first training input sequence. Once generated, the system can include the modified first training input sequence in the set of training data.

Figure 4:
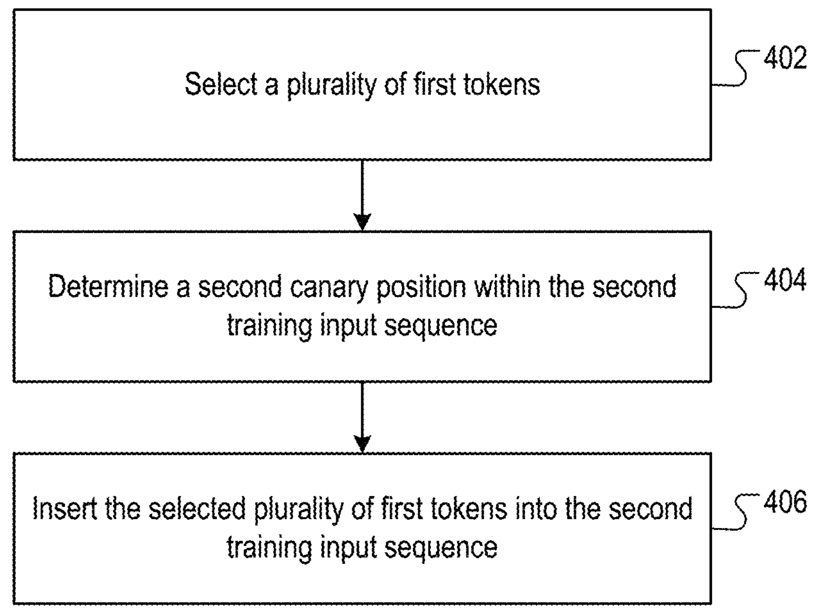
FIG. 4 is a flow diagram of sub-steps of one of the steps of the process of FIG. 2.

Optionally, in some implementations, the system also generates a modified second training input sequence based on the first training input sequence and the second training input sequence (step 206). Generating the modified second training input sequence is described below with reference to FIG. 4, which is a flow diagram of sub-steps 402-406 of step 206 of the process 200 of FIG. 2.

The system selects a plurality of first tokens from the first tokens included in the first training input sequence (step 402). The number of first tokens to be selected can be predetermined, e.g., it can equal the number of second tokens in step 304. The plurality of first tokens can be a sequence of tokens that are adjacent to each other within the first training input sequence, i.e., that occupy multiple contiguous positions in the first training input sequence.

The system determines a second canary position within the second training input sequence (step 404). In some implementations, the second canary position can be determined independently of the positions of the selected plurality of first tokens within the first training input sequence. For example, the second canary position can be determined with uniform randomness, i.e., can be any position within the second training input sequence.

In some other implementations, the second canary position can be determined based on positions of the selected plurality of first tokens within the first training input sequence. For example, the second canary position within the second training input sequence can generally correspond to the positions of the selected plurality of first tokens within the first training input sequence.

That is, if the plurality of first tokens were taken from a first half of the first training input sequence, e.g., taken from within a threshold number of proportion of tokens of the beginning of the first training input sequence, then the second canary position can similarly be in the first half of the second training input sequence, e.g., within the threshold number of proportion of tokens of the beginning of the second training input sequence.

Analogously, if the plurality of first tokens were taken from a second half of the first training input sequence, e.g., taken from within a threshold number of proportion of tokens of the end of the first training input sequence, then the second canary position can similarly be in the second half of the second training input sequence, e.g., within the threshold number of proportion of tokens of the end of the second training input sequence.

The system generates the modified second training input sequence by inserting the selected plurality of first tokens into the second training input sequence after the second canary position, i.e., by placing the selected plurality of first tokens at multiple (e.g. multiple contiguous) positions beginning from the second canary position in the second training input sequence (step 406). Thus, the modified second training input sequence includes the second tokens that were initially included in the second training input sequence, as well as a plurality of first tokens that were taken from the first training input sequence. The plurality of first tokens that were taken from the first training input sequence thus act as canary tokens, i.e. they are additional tokens that were not originally included in the second training input sequence. The second canary position may be the first position in which one of these canary tokens is inserted into the second training input sequence. Once generated, the system can include the modified second training input sequence in the set of training data.

The system trains the neural network on the training data that includes the modified first training input sequence and, optionally, the second training input sequence (step 208). The system performs the training over a plurality of update iterations. At each update iteration, the system updates the parameters of the neural network based on respective gradients of an objective function, e.g., a pre-training objective function, computed with respect to the parameters of the neural network using a plurality of training input sequences sampled from the training data. The modified first training input sequence (or the second training input sequence) will be included in the plurality of training input sequences that are sampled in at least one of update iterations.

After the training, the system uses the neural network, which has now been trained on the training data that includes the modified first training input sequence and, optionally, the second training input sequence, to generate one or more predicted continuations of a test input sequence by processing the test input sequence in accordance with the updated values of the parameters of the neural network (step 210). The test input sequence includes a subset of the first tokens that were initially included in the first training input sequence. For example, the subset of the first tokens can include some of the tokens that occupy the positions in the modified first training input sequence that precede the first canary position.

That is, the neural network is used to predict, given the subset of the first tokens, the next tokens that follow the subset of the first tokens in the training data on which it has been trained. To that end, each predicted continuation specifies a plurality of output tokens. Each output token specified by a given predicted continuation is a predicted next token as computed by the neural network that might follow the subset of the first tokens in the training data.

Each predicted continuation generated by the neural network can specify the output tokens directly, e.g., where the predicted continuation includes the plurality of output tokens, or indirectly, e.g., where the predicted continuation defines, for each of the plurality of output tokens, a score distribution over the vocabulary of tokens based on which the output token can be determined, i.e., selected from the vocabulary.

The system determines an estimate of a degree to which the trained neural network memorizes data in the set of training data on which it has been trained by evaluating the plurality of output tokens specified by each predicted continuation against the selected plurality of second tokens included in the modified first training input sequence (step 212).

For example, the system can determine an estimate of a degree to which the trained neural network memorizes data verbatim. Verbatim memorization refers to the situation in which neural networks reproduce specific portions of text that they processed during training, e.g., when the neural networks reproduce sequences of multiple consecutive tokens, e.g., text tokens that make up sentences or even passages of text, from their training corpus.

As another example, the system can determine an estimate of a degree to which the trained neural network memorizes data in the gist. Gist memorization refers to the situation in which neural networks reproduce a summarization of the text that they processed during training. For example the summarization can be an extractive summarization, where the output sequence generated by a neural network is a proper subset of one of the training input sequences, i.e., is made up of tokens from the training input sequence, processed by the neural network during the training.

In implementations each predicted continuation includes a plurality of output tokens, the system can compare the plurality of output tokens against the selected plurality of second tokens included in the modified first training input sequence, in order to determine whether there is a match between any of the output tokens and any of the selected plurality of second tokens. In this way, the system can determine how many of the selected plurality of second tokens included in the modified first training input sequence are also included in the plurality of output tokens included in each predicted continuation.

In these implementations, the estimate of the degree of training data memorization can be determined based on, e.g., in (approximate) proportion to or otherwise dependent on, the total count of the matches between the output tokens and the selected plurality of second tokens.

In implementations each predicted continuation defines, for each of the plurality of output tokens, a score distribution over the vocabulary of tokens, the system can compute a likelihood assigned to each token in at least a subset of the selected plurality of second tokens by the score distributions for the positions included in each predicted continuation. For example, for a given second token in the selected plurality of second tokens, its assigned likelihood can be a combination, e.g., product, of the scores included in the respective score distributions that have been generated for the given second token. As a specific example of this, suppose that one of the selected plurality of second tokens is the token "cat", and the predicted continuation has three positions. For each position, the score distribution generated by the neural network (which can be used to select the predicted token for the position) includes a score for the token "cat", among scores for other tokens in the vocabulary. For example, when the scores are P(cat)=0.05 for the first position in the predicted continuation, P(cat)=0.1 for the second position in the predicted continuation, and P(cat)=0.04 for the third position in the predicted continuation, then the likelihood for the token "cat" could be computed as a product of the three scores: 0.05×0.1×0.04=0.0002. In this way, the system can determine how likely any one of the selected plurality of second tokens included in the modified first training input sequence could be selected for inclusion in the plurality of output tokens included in each predicted continuation.

In these implementations, the estimate of the degree of training data memorization can be determined based on, e.g., in (approximate) proportion to or otherwise dependent on, the computed likelihood for each of at least the subset of the selected plurality of second tokens.

The system determines whether the estimate of the degree to which the trained neural network memorizes data in the set of training data satisfies a predetermined threshold by comparing the estimate to the predetermined threshold (step 214). For example, step 214 can involve determining whether the plurality of output tokens includes more than a threshold number of the selected plurality of second tokens. As another example, step 214 can involve determining whether the computed likelihood for each of at least the subset of the selected plurality of second tokens satisfies a likelihood threshold.

In response to determining that the estimate satisfies the predetermined threshold, the system applies one or more adjustments to the training of the neural network to adjust the estimate (step 216). For example when lower estimates indicate a lower degree of training data memorization, then the estimate may satisfy the predetermined threshold if the estimate is higher than the predetermined threshold.

In general the adjustments can modify any appropriate aspect of the training of the neural network that would potentially result in changes to the estimate, e.g., to lower the estimate when lower estimates indicate a lower degree of training data memorization. Merely as a few examples for illustration, the system can adjust the pre-training objective function, e.g., use alternative or new loss terms that penalize the neural network for verbatim memorization, assign different weights to existing loss terms, adjust the hyperparameters, e.g., adjust the learning rates or the choice of optimizer, and so forth.

This memorization evaluation technique enables a variety of technological improvements to neural networks that were previously not possible. Importantly, incorporating the memorization evaluation technique in the training of a neural network can lead to significant reductions in verbatim memorization by the trained neural network, and in particular for data that is not heavily repeated in the training data. Moreover, the memorization evaluation technique makes it more practical to conduct systematic studies on potential privacy risks in downstream use cases, including dialog or summarization tasks, of the trained neural network, and further facilitates the adoption of additional procedural and/or technical safeguard measures that might be necessary against extraction attacks.

Figure 5:
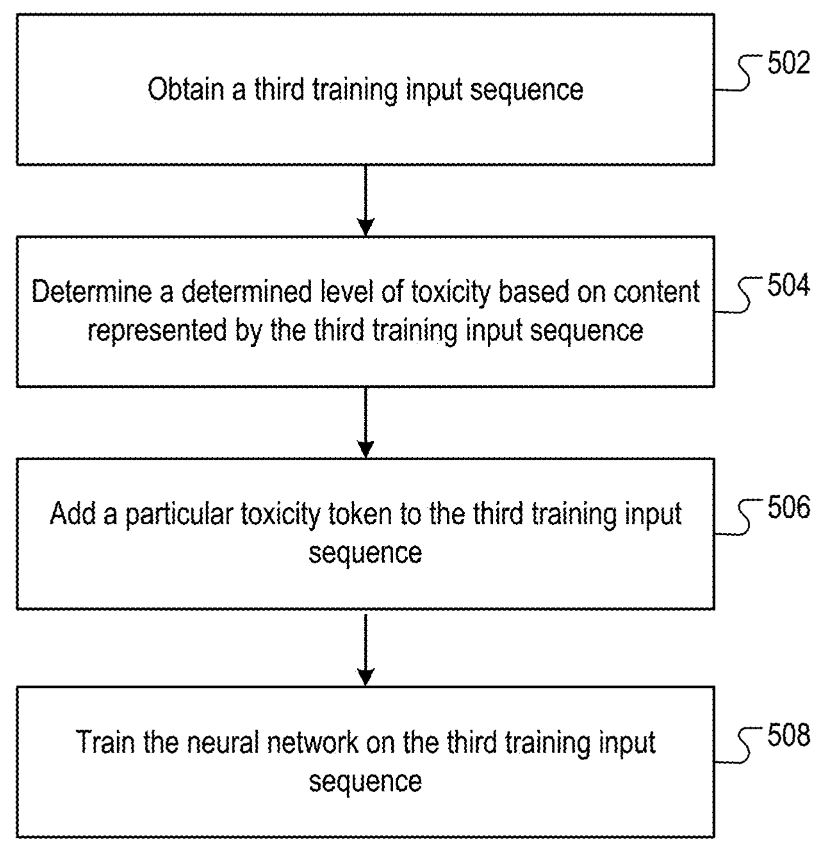
FIG. 5 is a flow diagram of another example process for training a neural network.

FIG. 5 is a flow diagram of another example process 500 for training a neural network that has parameters on a set of training data to repeatedly update values of the parameters the neural network. For convenience, the process 500 will be described as being performed by a system of one or more computers located in one or more locations. For example, a training system, e.g., the training system 100 of FIG. 1, appropriately programmed, can perform the process 500.

The set of training data includes multiple training input sequences. The set of training data can include unlabeled training input sequences. Each training input sequence has a plurality of positions. Each position has a token selected from a vocabulary of tokens. As mentioned above, the vocabulary of tokens can include one or more of characters, sub-words, words, punctuation marks, numbers, or other symbols that appear in a corpus of natural language text and/or computer code. Additionally, or alternatively, the vocabulary of tokens can include tokens that can represent data other than text. For example, the vocabulary of tokens can include image tokens that represent a discrete set of image embeddings of an image that can be generated by an image encoder neural network based on processing the image. As another example, the vocabulary of tokens can include audio tokens that represent code vectors in a codebook of a quantizer, e.g., a residual vector quantizer.

For example, the training input sequences included in the training data can be generated from a large dataset of text in one or more natural languages, e.g., text that is publicly available from the Internet or another text corpus, a large dataset of computer code in one or more programming languages, e.g., Python, C++, C#, Java, Ruby, PHP, and so on, e.g., computer code that is publicly available from the Internet or another code repository, a large dataset of audio samples, e.g., audio recordings or waveforms that represent the audio recordings, a large dataset of images where each image includes an array of pixels, a large dataset of videos where each video includes a temporal sequence of frames, or a large multi-modal dataset that includes a combination of two or more of these datasets.

The process 500 may be repeatedly performed for a relatively small portion of the training input sequences included in the training data. For example, iterations of process 500 can be performed for 0.5%, 1%, or 5% of all training input sequences included in the training data.

The system obtains, e.g., through sampling, a third training input sequence from the training data (step 502).

The system determines, from a plurality of levels of toxicity, a determined level of toxicity based on content represented by the third training input sequence (step 504). To automatically determine the level of toxicity for the third training input sequence, the system can use a text classifier machine learning model or a deterministic text-based classification algorithm, for example.

In some implementations, the plurality of levels of toxicity can include two or more levels of toxicity, e.g., level 0 and level 1. In some implementations, the plurality of levels of toxicity can include three or more levels of toxicity, e.g., level 0, level 1, and level 2, where greater numbers indicate higher toxicity levels.

The system adds a particular toxicity token corresponding to the determined level of toxicity to the third training input sequence (step 506). For example, the particular toxicity token can be prepended to the beginning of the third training input sequence, appended to the end of the third training input sequence, or inserted into any appropriate position within the third training input sequence.

In some implementations, the system determines whether to add the particular toxicity token to the third training input sequence based on a total number of training input sequences to which toxicity tokens have been added. For example, the system will determine to add the particular toxicity token if toxicity tokens (that correspond to the same or different levels of toxicity) have been added to no more than a predetermined number of training input sequences included in the training data.

The system trains the neural network on the training data that includes the third training input sequence which now includes the particular toxicity token (step 508). The system performs the training over a plurality of update iterations. At each update iteration, the system updates the parameters of the neural network based on respective gradients of an objective function, e.g., a pre-training objective function, computed with respect to the parameters of the neural network using a plurality of training input sequences sampled from the training data. The third training input sequence will be included in the plurality of training input sequences that are sampled in at least one of update iterations.

Advantageously, incorporating such toxicity tokens in the training data improves the performance of the trained neural network. For example an output sequence generated by the trained neural network from processing a context sequence that includes, e.g., is prepended with or appended by, a toxicity token that corresponds to a low level of toxicity will have a lower, sometimes significantly lower, likelihood to contain toxic content, and the trained neural network is thus more suitable for deployment in a variety of environments such as within an educational or medical organization in which any harmful behavior of the deployed neural network may result in serious consequences.

Figure 6:
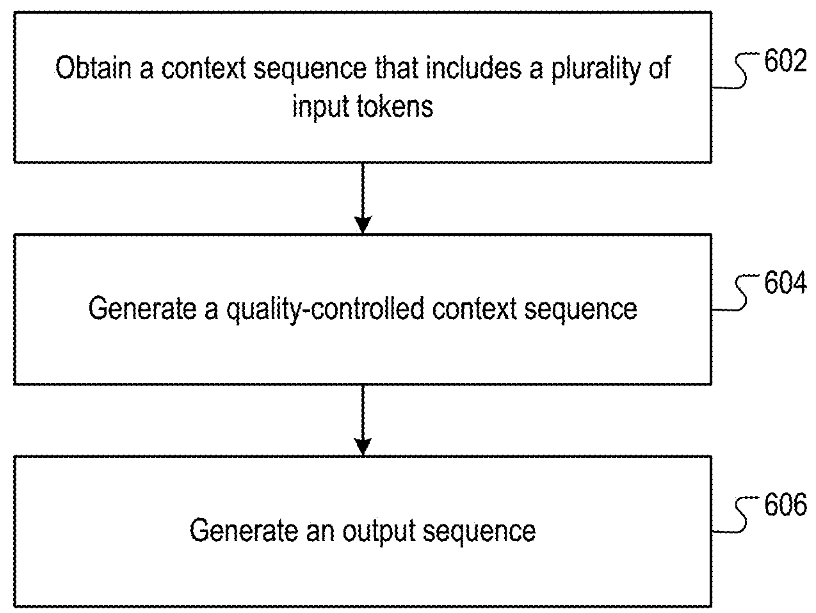
FIG. 6 is a flow diagram of an example process for using a trained neural network to generate an output sequence.

FIG. 6 is a flow diagram of an example process 600 for using a neural network to generate an output sequence. The neural network can be a neural network that has been trained using at least the technique discussed above with reference to FIG. 5. For convenience, the process 600 will be described as being performed by a system of one or more computers located in one or more locations. For example, a training system, e.g., the training system 100 of FIG. 1, appropriately programmed, can perform the process 600.

The system obtains a context sequence that includes a plurality of input tokens (step 602). In some cases, the context sequence includes user-specified prompt text, i.e., includes input tokens submitted by a user of the system. In some cases, the context sequence includes predetermined prompt text stored in the system. In some cases, the context sequence includes both the user-specified prompt text and the predetermined prompt, e.g., it can be a concatenation of the user-specified prompt text and the predetermined prompt.

The system generates, from the context sequence, a quality-controlled context sequence (step 604). The quality-controlled context sequence can be generated by adding to the context sequence a particular toxicity token. The particular toxicity token can be any one of the toxicity tokens selected from the plurality of toxicity tokens that represent different levels of toxicity of content to be represented by an output sequence. For example, the quality-controlled context sequence includes the particular quality token followed by the plurality of input tokens, or the other way around.

The system generates, by using the neural network, an output sequence based on processing the quality-controlled context sequence (step 606). The output sequence includes a plurality of output tokens. For example, if the particular toxicity token that is included in the quality-controlled context sequence corresponds to a low level of toxicity, then, because of the way the neural network has been trained as described above with reference to FIG. 5, the particular toxicity will cause the neural network to generate an output sequence that has a lower, sometimes significantly lower, likelihood to contain toxic content, e.g., relative to an output sequence generated by the same neural network (or another conventionally trained neural network) from a context sequence that does not include such a toxicity token.

Figure 7:
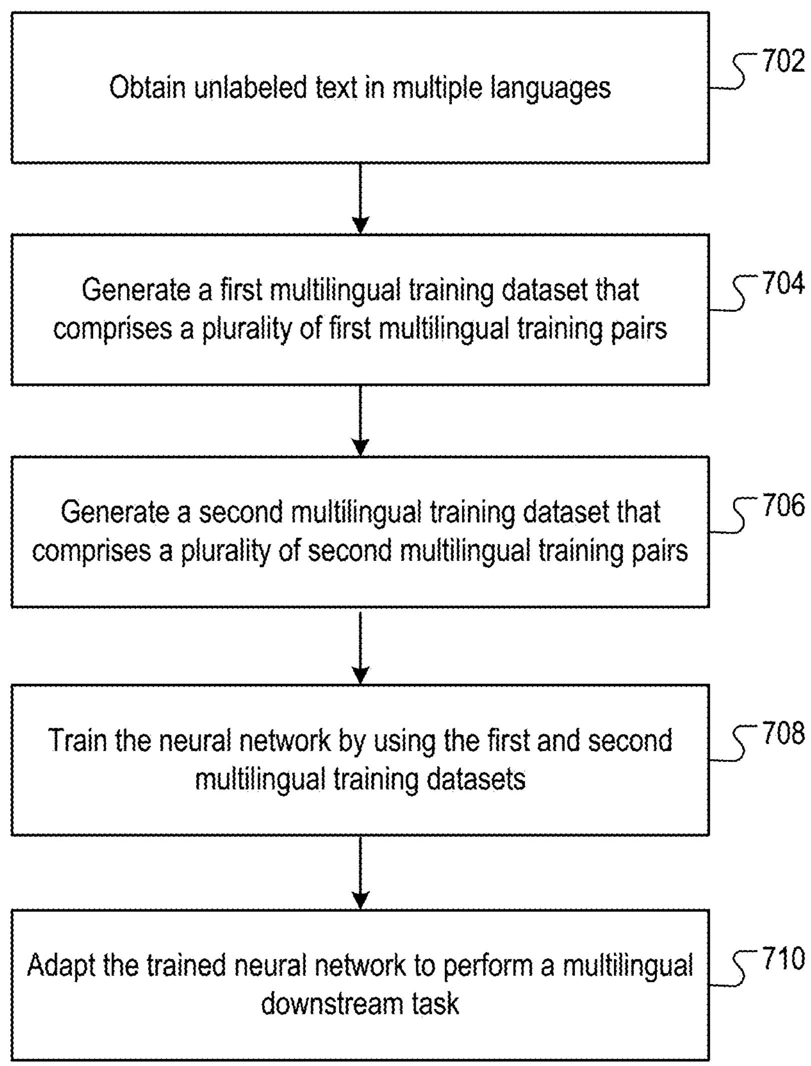
FIG. 7 is a flow diagram of another example process for training a neural network.

FIG. 7 is a flow diagram of another example process 700 for training a neural network that has parameters on a set of training data to repeatedly update values of the parameters the neural network. For convenience, the process 700 will be described as being performed by a system of one or more computers located in one or more locations. For example, a training system, e.g., the training system 100 of FIG. 1, appropriately programmed, can perform the process 700.

The set of training data includes multiple training input sequences. The set of training data can include unlabeled training input sequences. Each training input sequence has a plurality of positions. Each position has a token selected from a vocabulary of text tokens. As mentioned above, the vocabulary of text tokens can include one or more of characters, sub-words, words, punctuation marks, numbers, or other symbols that appear in a corpus of natural language text and/or computer code.

For example, the training input sequences included in the training data can be generated from electronic documents (e.g., books, web pages (e.g., HTML pages), news articles, or other documents) that can be found in a corpus (e.g., a collection or repository of content) that is available on the Internet or another text corpus.

The system obtains unlabeled text in multiple languages (step 702). That is, the system obtains one or more training input sequences that each include text tokens in a first language, obtains one or more other training input sequences that each include text tokens in a second language, and obtains one or more other training input sequences that each include text tokens in a third language.

The system generates, from the unlabeled text, a first multilingual training dataset that includes a plurality of first multilingual training pairs (step 704). Each first multilingual training pair includes a first source text sequence and a first target text sequence. In some implementations, the first source text sequence and the first target text sequence have similar lengths as each other, i.e., include approximately the same number of text tokens, while in other implementations, they can have different lengths than each other.

The system generates, from the unlabeled text, a second multilingual training dataset that includes a plurality of second multilingual training pairs (step 706). Each second multilingual training pair includes a second source text sequence and a second target text sequence.

In some implementations, the first multilingual training dataset and the second multilingual training dataset include an overlapping set of text sequences. For example, the first source text sequences included in first multilingual training dataset are the same as the second source text sequences included in second multilingual training dataset. In other implementations, the first multilingual training dataset and the second multilingual training dataset include distinct sets of text sequences. For example, the first source text sequences included in first multilingual training dataset are different from the second source text sequences included in second multilingual training dataset.

In particular, however, the first source text sequence and the second source text sequence are both in a same language while the first target text sequence and the second target text sequence are in different languages. For example, the first source text sequence and the second source text sequence both include text tokens in the first language, the first target text sequence includes text tokens in the second language, and the second target text sequence includes text tokens in the third language.

The system trains a neural network on the first and second multilingual training datasets (step 708). The system performs the training over a plurality of update iterations. At each update iteration, the system updates the parameters of the neural network based on respective gradients of an objective function, e.g., a pre-training objective function, computed with respect to the parameters of the neural network using a plurality of first multilingual training pairs sampled from the first multilingual training dataset, or using a plurality of second multilingual training pairs sampled from the second multilingual training dataset.

Merely as an example for illustration, for a given first multilingual training pair sampled from the first multilingual training dataset, the system can train the neural network on a pre-training language modeling task that requires predicting, given (a portion of) a first source text sequence that include text tokens in the first language, predicted text tokens in the second language that make up the first target text sequence that follows the first source text sequence in given first multilingual training pair.

After the training, the system adapts, e.g., through fine-tuning, zero-shot, or few-shot adaptation, the trained neural network to perform a multilingual downstream task (step 710). The multilingual downstream task can be any task that involve processing text tokens in two or more languages.

For example, the trained neural network can be adapted to perform a translation task by processing an input text sequence in a source language to generate an output text sequence in a target language that is a translation of the input text sequence into the target language.

As another example, the trained neural network can be adapted to perform a multilingual question answering task by processing an input text sequence in both source and target languages to generate an output text sequence in the target language that is a response to the input text sequence.

Training the neural network on the multilingual training data improves its capability to understand and generate multilingual outputs, thus it can be more easily adapted to any of a range of multilingual downstream task. Once adapted, the neural network can achieve or even exceed the performance of a conventionally pre-trained neural network on any of the multilingual downstream tasks, despite an adaptation process that consumes fewer computing resources, is faster in terms of wall-clock time, or both.

Figure 8:
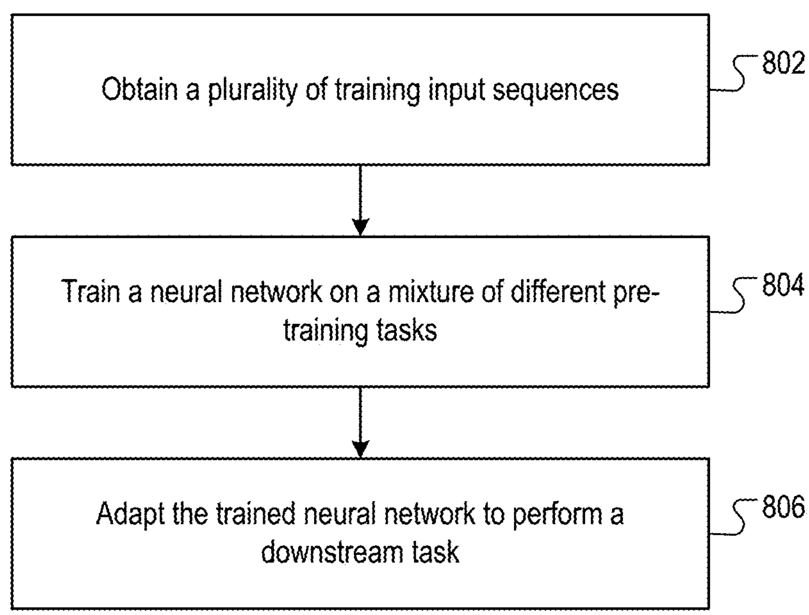
FIG. 8 is a flow diagram of another example process for training a neural network based on optimizing multiple different pre-training objective functions.

FIG. 8 is a flow diagram of another example process 800 for training a neural network that has parameters on a mixture of different pre-training tasks on a set of training data includes multiple training input sequences. The multiple training input sequences can include unlabeled training input sequences. The neural network can be an autoregressive generative neural network that includes one or more self-attention layers. For convenience, the process 800 will be described as being performed by a system of one or more computers located in one or more locations. For example, a training system, e.g., the training system 100 of FIG. 1, appropriately programmed, can perform the process 800.

For example, the training input sequences included in the training data can be generated from a large dataset of text in one or more natural languages, e.g., text that is publicly available from the Internet or another text corpus, a large dataset of computer code in one or more programming languages, e.g., Python, C++, C#, Java, Ruby, PHP, and so on, e.g., computer code that is publicly available from the Internet or another code repository, a large dataset of audio samples, e.g., audio recordings or waveforms that represent the audio recordings, a large dataset of images where each image includes an array of pixels, a large dataset of videos where each video includes a temporal sequence of frames, or a large multi-modal dataset that includes a combination of two or more of these datasets.

The system can repeatedly perform iterations of the process 800 to repeatedly update the parameters of the neural network until a termination criterion has been satisfied, e.g., until a threshold number of iterations of the process 800 have been performed, until a threshold amount of wall clock time has elapsed, or until the values of the parameters have converged.

The system obtains, e.g., through sampling, a plurality of training input sequences from the training data (step 802). Each training input sequence has a plurality of positions. Each position has a token selected from a vocabulary of tokens. As mentioned above, the vocabulary of tokens can include one or more of characters, sub-words, words, punctuation marks, numbers, or other symbols that appear in a corpus of natural language text and/or computer code. Additionally, or alternatively, the vocabulary of tokens can include tokens that can represent data other than text. For example, the vocabulary of tokens can include image tokens that represent a discrete set of image embeddings of an image that can be generated by an image encoder neural network based on processing the image. As another example, the vocabulary of tokens can include audio tokens that represent code vectors in a codebook of a quantizer, e.g., a residual vector quantizer.

The system trains the neural network on a mixture of different pre-training tasks (step 804). Each pre-training task uses a respective pre-training objective function. Each pre-training task focuses on training the neural network to learn a different aspect of language modeling. By training the neural network on the mixture of different pre-training tasks, the system can train the neural network in a way that improves its generalization capabilities at the adaptation stage, i.e., relative to training the neural network on a single pre-training task.

The mixture of different pre-training tasks includes two or more of: (i) a causal language modeling pre-training task (as described further below with reference to FIG. 9), (ii) a prefix language modeling pre-training task (as described further below with reference to FIG. 10), or (iii) a span corruption pre-training task (as described further below with reference to FIG. 11).

In some implementations, the system maintains a respective weight for each of the multiple different pre-training tasks. In some of these implementations, the system can repeatedly: sample a plurality of training input sequences from the training data, sample a pre-training task from the multiple different pre-training tasks in accordance with their respective weights, and train the neural network to perform the sampled pre-training task by using the plurality of training input sequences. In this way, the system trains the neural network using the plurality of training input sequences on the same pre-training task. In some others of these implementations, the system can sample a plurality of training input sequences from the training data, and then, for each of a subset of plurality of training input sequences: sample a pre-training task from the multiple different pre-training tasks in accordance with their respective weights, and train the neural network to perform the sampled pre-training task by using the subset of the plurality of training input sequences. In this way, the system trains the neural network using the plurality of training input sequences across different pre-training tasks.

Optionally, after the training, the system adapts, e.g., through fine-tuning, zero-shot, or few-shot adaptation, the trained neural network to perform one or more downstream tasks. The downstream tasks can include any combination of one or more of the machine learning tasks mentioned above and possibly other tasks. Additionally or alternatively, the system outputs data specifying the trained neural network, e.g., data specifying the trained values of the parameters and, optionally, the architecture of the neural network, to another system or for storage in one or more memory devices for future purposes.

Figure 9:
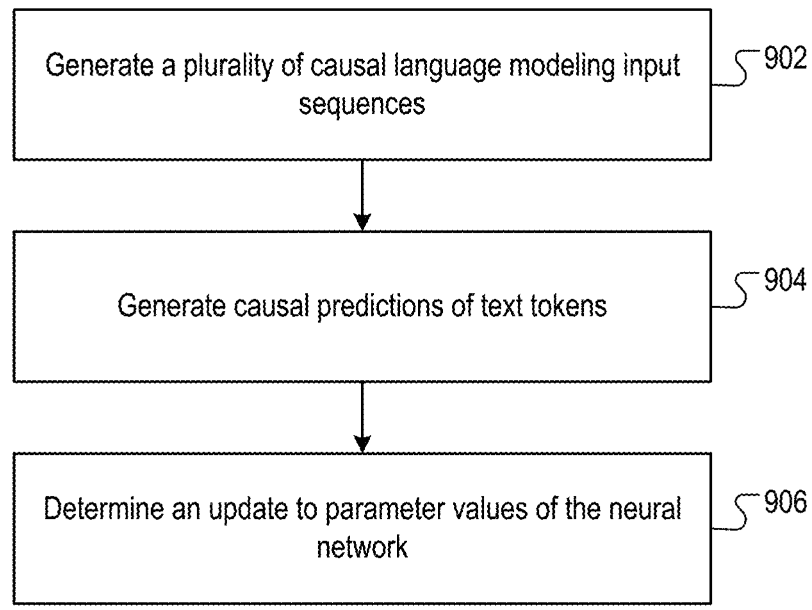
FIG. 9 is a flow diagram of sub-steps of one of the steps of the process of FIG. 8.

FIG. 9 is a flow diagram of sub-steps 902-906 of step 804 of the process of FIG. 8. By repeatedly performing iterations of sub-steps 902-906, the system can train the neural network on the causal language modeling pre-training task based on optimizing a causal language modeling objective function.

The system generates, from the plurality of training input sequences, a plurality of causal language modeling input sequences (step 902). In some implementations, a training input sequence can be used as a causal language modeling input sequence without further processing.

The system processes, using the neural network, each causal language modeling input sequence to generate, for each token in the causal language modeling input sequence, a causal prediction of a token that should occupy a particular position of the token in the causal language modeling input sequence when given the tokens at preceding positions that precede the particular position in the causal language modeling input sequence (step 904).

That is, for any given position in the causal language modeling input sequence, the neural network processes the tokens at preceding positions that precede the given position in the causal language modeling input sequence to generate, as output, a prediction of a token that should occupy the given position in the causal language modeling input sequence.

For example, for any given position, the neural network can generate a score distribution over the tokens in the vocabulary from which a predicted token to occupy the given position can be sampled. The score distribution can assign a respective score to each of the tokens in the vocabulary.

When processing the input sequence to generate, as output, a prediction of a token that should occupy a given position, each of the one or more self-attention layers within the neural network apply a masked self-attention mechanism over the preceding positions in the causal language modeling input sequence, so that the given position does not attend over, i.e., the self-attention layer does not generate a non-zero attention weight for, any data that is not at a position preceding the given position, or, put another way, the self-attention layer generates non-zero weights only to the positions preceding the given position in the causal language modeling input sequence.

The system determines, based on optimizing the causal language modeling objective function, an update to the values of the parameters of the neural network (step 906). The system can do this by computing, for each given position in each causal language modeling input sequence, respective gradients of the objective function with respect to the parameters of the neural network by backpropagation through the appropriate parameters of the neural network. The system can then determine the updates by applying an update rule, e.g., an Adam update rule, an Rmsprop update rule, or a stochastic gradient descent (SGD) update rule, to the respective gradients.

The causal language modeling objective function can be any function that measures a quality of the causal predictions generated by the neural network. For example, the causal language modeling objective function can include a cross entropy loss term or a negative log likelihood loss term that measures, for each given position in each causal language modeling input sequence, a difference between (i) a predetermined score for a ground truth token included in the causal language modeling input sequence that occupies the given position (ii) the respective score assigned to the ground truth token by the score distribution generated by the neural network. The loss function can also include other terms, e.g., regularization terms, auxiliary loss terms, and so on.

Figure 10:
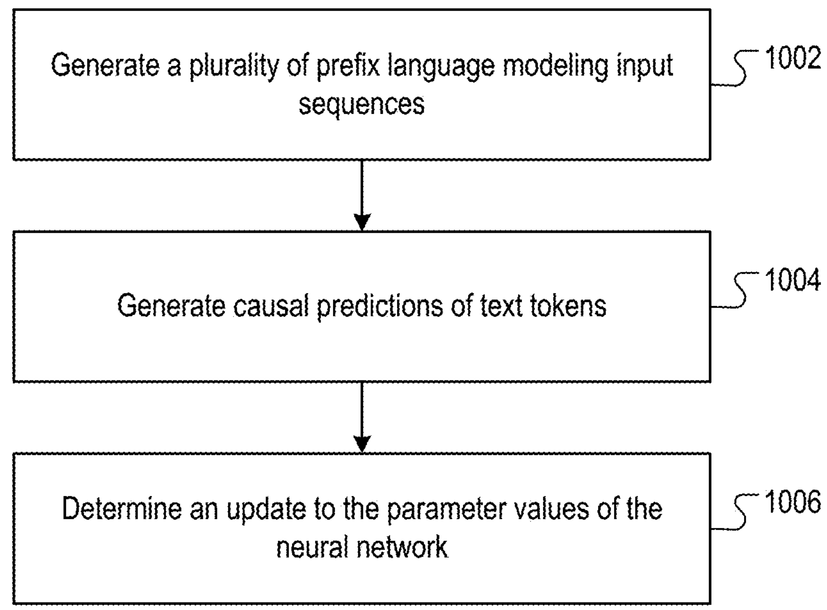
FIG. 10 is a flow diagram of sub-steps of one of the steps of the process of FIG. 8.

FIG. 10 is a flow diagram of sub-steps 1002-1006 of step 804 of the process of FIG. 8. By repeatedly performing iterations of sub-steps 1002-1006, the system can train the neural network on the prefix language modeling pre-training task based on optimizing a prefix language modeling objective function.

The system generates, from the plurality of training input sequences, a plurality of prefix language modeling input sequences (step 1002). Each prefix language modeling input sequence includes a prefix input sequence followed by a suffix input sequence. The prefix input sequence and the suffix input sequence can each include a respective subset of the tokens included in the prefix language modeling text sequence.

In some implementations, a prefix language modeling input sequence can be generated from a training input sequence by dividing the training input sequence into two sequences (or subsequences), namely a prefix input sequence and a suffix input sequence. For example, the prefix input sequence can include a first subset of contiguous tokens included in the prefix language modeling text sequence, and the suffix input sequence can include a second subset of contiguous tokens included in the prefix language modeling text sequence that follows the first subset of contiguous tokens.

The system processes, using the neural network, each prefix language modeling input sequence to generate, for each token in the suffix input sequence, a causal prediction of a token that should occupy a particular position of the token in the suffix input sequence conditioned on (a) tokens in the prefix input sequence and (b) tokens at any preceding positions in the suffix input sequence that precede the particular position in the prefix language modeling input sequence (step 1004).

That is, for any given position in the suffix input sequence in the prefix language modeling input sequence, the neural network processes an input sequence that includes (a) tokens in the prefix input sequence that precedes the suffix input sequence in the prefix language modeling input sequence and (b) tokens at any preceding positions in the suffix input sequence that precede the particular position in the prefix language modeling input sequence to generate, as output, a prediction of a token that should occupy the given position in the suffix input sequence.

For example, for any given position, the neural network can generate a score distribution over the tokens in the vocabulary from which a predicted token to occupy the given position can be sampled. The score distribution can assign a respective score to each of the tokens in the vocabulary.

When processing the input sequence to generate, as output, a prediction of a token that should occupy a given position, each of the one or more self-attention layers within the neural network apply (i) a bidirectional, unmasked attention mechanism over the positions in the prefix input sequence, and (ii) a masked self-attention mechanism over positions in the suffix input sequence, so that the given position attends over all of the positions in the prefix input sequence and any preceding positions in the suffix input sequence that precede the given position. In the meanwhile, any position in the prefix input sequence can attend over any other position in the prefix input sequence, including any subsequent position that is after the position in the prefix input sequence. However, the given position does not attend over, i.e., the self-attention layer generates a zero attention weight for, any data that is at a position after the given position in the suffix input sequence, or, put another way, the self-attention layer generates non-zero attention weights only for the positions in the prefix input sequence and positions preceding the given position in the suffix input sequence.

The system determines, based on optimizing the prefix language modeling objective function, an update to the values of the parameters of the neural network (step 1006). The system can do this by computing, for each given position in the suffix input sequence in each prefix language modeling input sequence, respective gradients of the objective function with respect to the parameters of the neural network by backpropagation through the appropriate parameters of the neural network. The system can then determine the updates by applying an update rule, e.g., an Adam update rule, an Rmsprop update rule, or a stochastic gradient descent (SGD) update rule, to the respective gradients.

The prefix language modeling objective function can be any function that measures on a quality of the prefix predictions generated by the neural network. For example, the prefix language modeling objective function can include a cross entropy loss term or a negative log likelihood loss term that measures, for each given position in the suffix input sequence in each prefix language modeling input sequence, a difference between (i) a predetermined score for a ground truth token included in the suffix input sequence that occupies the given position (ii) the respective score assigned to the ground truth token by the score distribution generated by the neural network. The loss function can also include other terms, e.g., regularization terms, auxiliary loss terms, and so on.

Figure 11:
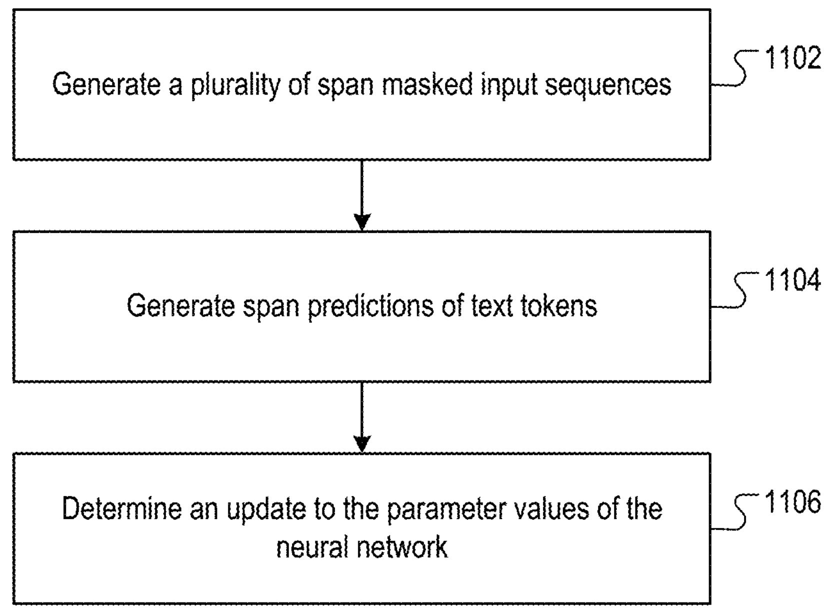
FIG. 11 is a flow diagram of sub-steps of one of the steps of the process of FIG. 8.

FIG. 11 is a flow diagram of sub-steps 1102-1106 of step 804 of the process of FIG. 8. By repeatedly performing iterations of sub-steps 1102-1106, the system can train the neural network on the span corruption pre-training task based on optimizing a span corruption objective function.

The system generates, from the plurality of training input sequences, a plurality of span masked input sequences (step 1102). Each span masked input sequence includes a plurality of tokens separated by one or more mask tokens. A "mask token" is a token that includes predetermined numerical values and that signifies that the token to occupy the position of the mask token has not been generated, e.g., selected from the vocabulary of tokens, yet.

In some implementations, a span masked input sequence can be generated from a corresponding training input sequence by replacing a subset of the tokens included in the training input sequence with mask tokens. The subset of the tokens can include tokens that are adjacent to each other within the training input sequence, i.e., that occupy multiple contiguous positions in the training input sequence.

For each span masked input sequence, the system processes, using the neural network, the span masked input sequence to generate a prediction of the one or more tokens that should occupy respective positions of the one or more mask tokens in the span masked input sequence (step 1104). For example, for any position that is occupied by a mask token, the neural network can generate a score distribution over the tokens in the vocabulary from which a predicted token to occupy the position, i.e., to replace the mask token, can be sampled. The score distribution can assign a respective score to each of the tokens in the vocabulary.

The system determines, based on optimizing the span corruption objective function, an update to the values of the parameters of the neural network (step 1106). The system can do this by computing, for each given position in each prefix language modeling input sequence, respective gradients of the objective function with respect to the parameters of the neural network by backpropagation through the appropriate parameters of the neural network. The system can then determine the updates by applying an update rule, e.g., an Adam update rule, an Rmsprop update rule, or a stochastic gradient descent (SGD) update rule, to the respective gradients.

The span corruption objective function can be any function that measures on a quality of the span predictions generated by the neural network. For example, the span corruption can include a cross entropy loss term or a negative log likelihood loss term that measures, for any position that is occupied by a mask token in each span masked input sequence, a difference between (i) a predetermined score for a ground truth token included in the corresponding training input sequence (based on which the span masked input sequence is generated) that occupies the position (ii) the respective score assigned to the ground truth token by the score distribution generated by the neural network. The loss function can also include other terms, e.g., regularization terms, auxiliary loss terms, and so on.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a JAX framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, wherein the method comprises:

obtaining a plurality of unlabeled text sequences, wherein each unlabeled text sequence comprises a plurality of text tokens;

training an autoregressive generative neural network comprising one or more self-attention layers based on optimizing multiple different pre-training objective functions that comprise (i) a causal language modeling objective function and (ii) a prefix language modeling objective function, wherein training the autoregressive generative neural network based on optimizing the multiple different pre-training objective functions comprises:

obtaining data specifying a respective weight assigned to each of the multiple different pre-training objective functions; and repeatedly (a) selecting, based on the respective weights, a pre-training objective function from the multiple different pre-training objective functions and (b) training the autoregressive generative neural network on the selected pre-training objective function, wherein training the autoregressive generative neural network based on optimizing the causal language modeling objective function comprises:

generating, from the plurality of unlabeled text sequences, a plurality of causal language modeling text sequences, wherein generating each causal language modeling text sequence comprises using a corresponding unlabeled text sequence as the causal language modeling text sequence without further processing the corresponding unlabeled text sequence to add to the corresponding unlabeled text sequence any additional tokens that were not included in the corresponding unlabeled text sequence;

processing, using the autoregressive generative neural network, each causal language modeling text sequence to generate, for each token in the causal language modeling text sequence, a causal prediction of a text token that should occupy a particular position of the text token in the causal language modeling text sequence conditioned on text tokens at preceding positions in the causal language modeling text sequence, wherein the one or more self-attention layers within the autoregressive generative neural network apply a masked self-attention mechanism over the preceding positions in the causal language modeling text sequence; and determining, based on a quality of the causal predictions, an update to parameter values of the autoregressive generative neural network, and wherein training the autoregressive generative neural network based on optimizing the prefix language modeling objective function comprises:

generating, from the plurality of unlabeled text sequences, a plurality of prefix language modeling text sequences, wherein generating each prefix language modeling text sequence comprises further processing a corresponding unlabeled text sequence to divide the corresponding unlabeled text sequence into a prefix text sequence and a suffix text sequence that follows the prefix text sequence;

processing, using the autoregressive generative neural network, each prefix language modeling text sequence to generate, for each token in the suffix text sequence, a prefix prediction of a text token that should occupy a particular position of the token in the suffix text sequence conditioned on tokens in the prefix text sequence and tokens at any preceding positions in the suffix text sequence, wherein the one or more self-attention layers within the autoregressive generative neural network applies a bidirectional, unmasked attention mechanism over the positions in the prefix text sequence and applies a masked self-attention mechanism over positions in the suffix text sequence so that each position in the suffix text sequence attend over the positions in the prefix text sequence and any preceding positions in the suffix text sequence; and determining, based on a quality of the prefix predictions, an update to the parameter values of the autoregressive generative neural network.

2. The method of claim 1, wherein the multiple different pre-training objective functions comprise (iii) a span corruption objective function, and wherein training the autoregressive generative neural network based on optimizing the span corruption objective function comprises:

generating, from the plurality of unlabeled text sequences, a plurality of span masked text sequences, wherein each span masked text sequence comprises a plurality of text tokens separated by one or more mask tokens, and wherein generating each span masked text sequence comprises further processing a corresponding unlabeled text sequence to replace one or more text tokens that were included in the corresponding unlabeled text sequence with the one or more mask tokens that were not included in the corresponding unlabeled text sequence;

processing, using the autoregressive generative neural network, each span masked text sequence to generate a span prediction of the one or more text tokens that should occupy respective positions of the one or more mask tokens in the span masked text sequence; and determining, based on a quality of the span prediction, an update to the parameter values of the autoregressive generative neural network.

3. The method of claim 1, further comprising:

sampling a batch of unlabeled text sequences; and processing the batch of unlabeled text sequences according to the selected pre-training objective function.

4. The method of claim 1, wherein repeatedly selecting the pre-training objective function from the multiple different pre-training objective functions comprises:

sampling a batch of unlabeled text sequences;

selecting, based on the respective weights, a first pre-training objective function from the multiple different pre-training objective functions;

processing a first subset of the batch of unlabeled text sequences according to the first selected pre-training objective function;

selecting, based on the respective weights, a second pre-training objective function from the multiple different pre-training objective functions; and processing a second subset of the batch of unlabeled text sequences according to the second selected pre-training objective function.

5. The method of claim 1, wherein the autoregressive generative neural network is a decoder-only attention neural network.

6. The method of claim 1, wherein the autoregressive generative neural network is an encoder-decoder attention neural network.

7. The method of claim 1, further comprising:

after the training, adapting the autoregressive generative neural network to perform one or more downstream tasks.

8. A system comprising one or more computers and one or more storage devices storing instructions that when executed by the one or more computers cause the one more computers to perform operations comprising:

obtaining a plurality of unlabeled text sequences, wherein each unlabeled text sequence comprises a plurality of text tokens;

training an autoregressive generative neural network comprising one or more self-attention layers based on optimizing multiple different pre-training objective functions that comprise (i) a causal language modeling objective function and (ii) a prefix language modeling objective function, wherein training the autoregressive generative neural network based on optimizing the multiple different pre-training objective functions comprises:

obtaining data specifying a respective weight assigned to each of the multiple different pre-training objective functions; and repeatedly (a) selecting, based on the respective weights, a pre-training objective function from the multiple different pre-training objective functions and (b) training the autoregressive generative neural network on the selected pre-training objective function, wherein training the autoregressive generative neural network based on optimizing the causal language modeling objective function comprises:

generating, from the plurality of unlabeled text sequences, a plurality of causal language modeling text sequences, wherein generating each causal language modeling text sequence comprises using a corresponding unlabeled text sequence as the causal language modeling text sequence without further processing the corresponding unlabeled text sequence to add to the corresponding unlabeled text sequence any additional tokens that were not included in the corresponding unlabeled text sequence;

processing, using the autoregressive generative neural network, each causal language modeling text sequence to generate, for each token in the causal language modeling text sequence, a causal prediction of a text token that should occupy a particular position of the text token in the causal language modeling text sequence conditioned on text tokens at preceding positions in the causal language modeling text sequence, wherein the one or more self-attention layers within the autoregressive generative neural network apply a masked self-attention mechanism over the preceding positions in the causal language modeling text sequence; and determining, based on a quality of the causal predictions, an update to parameter values of the autoregressive generative neural network, and wherein training the autoregressive generative neural network based on optimizing the prefix language modeling objective function comprises:

generating, from the plurality of unlabeled text sequences, a plurality of prefix language modeling text sequences, wherein generating each prefix language modeling text sequence comprises further processing a corresponding unlabeled text sequence to divide the corresponding unlabeled text sequence into a prefix text sequence and a suffix text sequence that follows the prefix text sequence;

processing, using the autoregressive generative neural network, each prefix language modeling text sequence to generate, for each token in the suffix text sequence, a prefix prediction of a text token that should occupy a particular position of the token in the suffix text sequence conditioned on tokens in the prefix text sequence and tokens at any preceding positions in the suffix text sequence, wherein the one or more self-attention layers within the autoregressive generative neural network applies a bidirectional, unmasked attention mechanism over the positions in the prefix text sequence and applies a masked self-attention mechanism over positions in the suffix text sequence so that each position in the suffix text sequence attend over the positions in the prefix text sequence and any preceding positions in the suffix text sequence; and determining, based on a quality of the prefix predictions, an update to the parameter values of the autoregressive generative neural network.

9. The system of claim 8, wherein the multiple different pre-training objective functions comprise (iii) a span corruption objective function, and wherein training the autoregressive generative neural network based on optimizing the span corruption objective function comprises:

generating, from the plurality of unlabeled text sequences, a plurality of span masked text sequences, wherein each span masked text sequence comprises a plurality of text tokens separated by one or more mask tokens, and wherein generating each span masked text sequence comprises further processing a corresponding unlabeled text sequence to replace one or more text tokens that were included in the corresponding unlabeled text sequence with the one or more mask tokens that were not included in the corresponding unlabeled text sequence;

processing, using the autoregressive generative neural network, each span masked text sequence to generate a span prediction of the one or more text tokens that should occupy respective positions of the one or more mask tokens in the span masked text sequence; and determining, based on a quality of the span prediction, an update to the parameter values of the autoregressive generative neural network.

10. The system of claim 8, wherein the operations further comprise:

sampling a batch of unlabeled text sequences; and processing the batch of unlabeled text sequences according to the selected pre-training objective function.

11. The system of claim 8, wherein repeatedly selecting the pre-training objective function from the multiple different pre-training objective functions comprises:

sampling a batch of unlabeled text sequences;

selecting, based on the respective weights, a first pre-training objective function from the multiple different pre-training objective functions;

processing a first subset of the batch of unlabeled text sequences according to the first selected pre-training objective function;

selecting, based on the respective weights, a second pre-training objective function from the multiple different pre-training objective functions; and processing a second subset of the batch of unlabeled text sequences according to the second selected pre-training objective function.

12. The system of claim 8, wherein the autoregressive generative neural network is a decoder-only attention neural network.

13. The system of claim 8, wherein the autoregressive generative neural network is an encoder-decoder attention neural network.

14. The system of claim 8, the operations further comprising:

after the training, adapting the autoregressive generative neural network to perform one or more downstream tasks.

15. One or more computer storage media storing instructions that when executed by one or more computers cause the one more computers to perform operations comprising:

obtaining a plurality of unlabeled text sequences, wherein each unlabeled text sequence comprises a plurality of text tokens;

training an autoregressive generative neural network comprising one or more self-attention layers based on optimizing multiple different pre-training objective functions that comprise (i) a causal language modeling objective function and (ii) a prefix language modeling objective function, wherein training the autoregressive generative neural network based on optimizing the multiple different pre-training objective functions comprises:

obtaining data specifying a respective weight assigned to each of the multiple different pre-training objective functions; and repeatedly (a) selecting, based on the respective weights, a pre-training objective function from the multiple different pre-training objective functions and (b) training the autoregressive generative neural network on the selected pre-training objective function, wherein training the autoregressive generative neural network based on optimizing the causal language modeling objective function comprises:

generating, from the plurality of unlabeled text sequences, a plurality of causal language modeling text sequences, wherein generating each causal language modeling text sequence comprises using a corresponding unlabeled text sequence as the causal language modeling text sequence without further processing the corresponding unlabeled text sequence to add to the corresponding unlabeled text sequence any additional tokens that were not included in the corresponding unlabeled text sequence;

processing, using the autoregressive generative neural network, each causal language modeling text sequence to generate, for each token in the causal language modeling text sequence, a causal prediction of a text token that should occupy a particular position of the text token in the causal language modeling text sequence conditioned on text tokens at preceding positions in the causal language modeling text sequence, wherein the one or more self-attention layers within the autoregressive generative neural network apply a masked self-attention mechanism over the preceding positions in the causal language modeling text sequence; and determining, based on a quality of the causal predictions, an update to parameter values of the autoregressive generative neural network, and wherein training the autoregressive generative neural network based on optimizing the prefix language modeling objective function comprises:

generating, from the plurality of unlabeled text sequences, a plurality of prefix language modeling text sequences, wherein generating each prefix language modeling text sequence comprises further processing a corresponding unlabeled text sequence to divide the corresponding unlabeled text sequence into a prefix text sequence and a suffix text sequence that follows the prefix text sequence;

processing, using the autoregressive generative neural network, each prefix language modeling text sequence to generate, for each token in the suffix text sequence, a prefix prediction of a text token that should occupy a particular position of the token in the suffix text sequence conditioned on tokens in the prefix text sequence and tokens at any preceding positions in the suffix text sequence, wherein the one or more self-attention layers within the autoregressive generative neural network applies a bidirectional, unmasked attention mechanism over the positions in the prefix text sequence and applies a masked self-attention mechanism over positions in the suffix text sequence so that each position in the suffix text sequence attend over the positions in the prefix text sequence and any preceding positions in the suffix text sequence; and determining, based on a quality of the prefix predictions, an update to the parameter values of the autoregressive generative neural network.

16. The computer storage media of claim 15, wherein the multiple different pre-training objective functions comprise (iii) a span corruption objective function, and wherein training the autoregressive generative neural network based on optimizing the span corruption objective function comprises:

generating, from the plurality of unlabeled text sequences, a plurality of span masked text sequences, wherein each span masked text sequence comprises a plurality of text tokens separated by one or more mask tokens, and wherein generating each span masked text sequence comprises further processing a corresponding unlabeled text sequence to replace one or more text tokens that were included in the corresponding unlabeled text sequence with the one or more mask tokens that were not included in the corresponding unlabeled text sequence;

processing, using the autoregressive generative neural network, each span masked text sequence to generate a span prediction of the one or more text tokens that should occupy respective positions of the one or more mask tokens in the span masked text sequence; and determining, based on a quality of the span prediction, an update to the parameter values of the autoregressive generative neural network.

17. The computer storage media of claim 15, wherein the operations further comprise:

sampling a batch of unlabeled text sequences; and processing the batch of unlabeled text sequences according to the selected pre-training objective function.

* * * * *